(12) United States Patent
Thomason

(10) Patent No.: US 12,238,168 B1
(45) Date of Patent: Feb. 25, 2025

(54) SYSTEMS AND METHODS FOR DATA INTEGRITY AND AUTHENTICATION IN A CONTENT-ADDRESSABLE PEER-TO-PEER STORAGE NETWORK

(71) Applicant: EDJX, Inc., Raleigh, NC (US)

(72) Inventor: James A. Thomason, Las Vegas, NV (US)

(73) Assignee: EDJX, Inc., Raleigh, NC (US)

( * ) Notice: Subject to any disclaimer, the term of this patent is extended or adjusted under 35 U.S.C. 154(b) by 451 days.

(21) Appl. No.: 17/496,397

(22) Filed: Oct. 7, 2021

Related U.S. Application Data

(60) Provisional application No. 63/089,864, filed on Oct. 9, 2020.

(51) Int. Cl.
*H04L 67/1097* (2022.01)
*H04L 9/08* (2006.01)
*H04L 9/32* (2006.01)

(52) U.S. Cl.
CPC ........ *H04L 67/1097* (2013.01); *H04L 9/0825* (2013.01); *H04L 9/3242* (2013.01); *H04L 9/3247* (2013.01)

(58) Field of Classification Search
CPC . H04L 67/1097; H04L 9/0825; H04L 9/3242; H04L 9/3247
See application file for complete search history.

(56) References Cited

U.S. PATENT DOCUMENTS

| | | | |
|---|---|---|---|
| 9,104,326 B2 | 8/2015 | Frank et al. | |
| 9,880,756 B2 | 1/2018 | Mutalik et al. | |
| 9,904,603 B2 | 2/2018 | Mutalik et al. | |
| 10,445,698 B2 | 10/2019 | Hunn | |
| 10,559,202 B2 | 2/2020 | Yang et al. | |
| 11,507,562 B1* | 11/2022 | Luedtke | H04L 9/50 |
| 2005/0044369 A1* | 2/2005 | Anantharaman | G06F 21/645 713/176 |
| 2007/0110063 A1* | 5/2007 | Tang | H04L 45/02 370/432 |
| 2014/0123123 A1* | 5/2014 | Bahls | G06F 8/65 717/170 |
| 2018/0331832 A1 | 11/2018 | Pulsifer | |
| 2018/0349621 A1* | 12/2018 | Schvey | H04L 63/04 |
| 2019/0014149 A1* | 1/2019 | Cleveland | G06N 3/045 |
| 2019/0036764 A1 | 1/2019 | Canessa et al. | |
| 2019/0327180 A1 | 10/2019 | Todd et al. | |
| 2019/0386995 A1 | 12/2019 | Chafe et al. | |
| 2020/0019626 A1 | 1/2020 | Todd et al. | |

(Continued)

FOREIGN PATENT DOCUMENTS

WO   WO-2020002948 A1 *   1/2020   ........... G06F 21/602

*Primary Examiner* — Luu T Pham
*Assistant Examiner* — Paul J Skwierawski
(74) *Attorney, Agent, or Firm* — NEO IP

(57) ABSTRACT

The present invention is a data protocol providing notarization of a data between two or more nodes on a content-addressable peer-to-peer storage network. A node generates a new data block, which is witnessed by peer nodes to increase the integrity of the data. Each peer node responds to the node's signature request with an encoded digital signature of the data using a private key. The node appends the signature from each witness node to the data block and then generates a cryptographic hash of the entire data block, which is used as the identity of the block.

20 Claims, 19 Drawing Sheets

(56) References Cited

U.S. PATENT DOCUMENTS

| | | | |
|---|---|---|---|
| 2020/0125604 A1 | 4/2020 | Canessa et al. | |
| 2020/0153786 A1 | 5/2020 | Ward et al. | |
| 2020/0409571 A1* | 12/2020 | Saad | G06F 3/0622 |
| 2021/0306133 A1* | 9/2021 | Mathew | H04L 9/3297 |
| 2021/0385065 A1* | 12/2021 | Syed | H04L 9/3239 |
| 2022/0294863 A1* | 9/2022 | Floyd | B60W 50/045 |

* cited by examiner

```
Block
QmVUdHfpo9hyC8wXmgd2frRrsp83iRvuL8HWyp1LPzjsPq => []

Where [] =
{
    "Links": [
            {
            "Name": "index.html",
            "Hash": "QmYftndCvcEiuSZRX7njywX2AGSeHY2ASa7VryCq1mKwEw",
            "Size": 1700
        },
        {
            "Name": "static",
            "Hash": "QmdtWFiasJeh2ymW3TD2cLHYxn1ryTuWoNpwieFyJriGTS",
            "Size": 2428803
        }
    ],
    "Data": "CAE=",
    "Signatures": [
        {
            "Node": "QmfNy1th16zscbpxe8Q2EQdQkNFn7Y3Rp9kGZWL1EQDyw6"
            "Signature": "PYM5Ls9NKcGdHKwjlKlBt2Va4aYrhiSw3+5+zUh1AQPSqzJB
nW5GQCuGY7uBbkP/xLtihbtKhZNh2ncxVKJ0GQ=="
        }
}

Node
QmfNy1th16zscbpxe8Q2EQdQkNFn7Y3Rp9kGZWL1EQDyw6 => []

Where [] =
{
    "ID": "QmfNy1th16zscbpxe8Q2EQdQkNFn7Y3Rp9kGZWL1EQDyw6",
    "PublicKey": "Xg8Y1132wpr6HN9nLiPlT3fmcn3rG/+VKkjGEsDj+BQ=,
    "Addresses": [

"/ip4/127.0.0.1/tcp/4001/QmfNy1th16zscbpxe8Q2EQdQkNFn7Y3Rp9kGZWL1EQDyw6",
"/ip4/172.19.0.2/tcp/4001/QmfNy1th16zscbpxe8Q2EQdQkNFn7Y3Rp9kGZWL1EQDyw6"
    ],
    "AgentVersion": "edjx/0.0.1/ac3ef2",
    "ProtocolVersion": "edjx/0.0.1"
}
```

FIG. 8

SYSTEMS AND METHODS FOR DATA INTEGRITY AND AUTHENTICATION IN A CONTENT-ADDRESSABLE PEER-TO-PEER STORAGE NETWORK

CROSS REFERENCES TO RELATED APPLICATIONS

This application is related to and claims priority from U.S. Provisional Patent Application No. 63/089,864, filed Oct. 9, 2020, which is incorporated herein by reference in its entirety.

BACKGROUND OF THE INVENTION

1. Field of the Invention

The present invention relates to data integrity and authentication, and more specifically to a data protocol providing notarization of data between two or more nodes on a content-addressable peer-to-peer storage network.

2. Description of the Prior Art

It is generally known in the prior art that a storage device may be location-addressed or content-addressed. In a location-based storage system, a unit of data may be stored on a physical medium, and the location recorded for later use using a Unique Resource Identifier (URI). For example, the Uniform Resource Identifier may identify the physical storage device by its DNS name or IP address, as well as the path to the physical location of the unit of data on the storage device. In contrast, in a content-addressed storage (CAS) system, a unit of data is assigned a globally unique identifier which is derived from the content of the unit of data itself, and the unit of data is accessed using this unique identifier. In a decentralized content-addressed storage system, location information is exchanged dynamically between storage devices on a network, permitting autonomous ad-hoc access to the unit of data. For example, the unit of data may be provided as the input to a hashing function, the resulting hash of which is used as the content-address of the unit of data.

Prior art patent documents include the following:

U.S. Patent Publication No. 20200019626 for Decentralized data management via geographic location-based consensus protocol by inventors Todd, et al., filed Jul. 12, 2018 and published Jan. 16, 2020, is directed to decentralized data management using a geographic location-based consensus protocol in a network of computing resources such as, by way of example, a highly distributed system. For example, at a given consensus node of a consensus network comprising a plurality of consensus nodes configured to participate in a consensus protocol wherein at least a portion of the consensus nodes are mobile, a list is obtained of at least a subset of the plurality of consensus nodes that are predicted to be currently available to participate in the consensus protocol based on geographic location information. A message comprising a transaction to be validated is sent from the given consensus node to the subset of the plurality of consensus nodes in the obtained list. Techniques are also disclosed for adjusting a data protection policy based on the number of computing nodes, some of which are mobile, available to participate.

U.S. Patent Publication No. 20190327180 for Decentralized data management across highly distributed systems by inventors Todd, et al., filed Apr. 23, 2018 and published Oct. 24, 2019, is directed to a system environment including a plurality of computing resources, wherein at least a portion of the computing resources are mobile, a method maintains a decentralized messaging network of interconnected messaging nodes and a decentralized data network of interconnected data nodes. Each of the plurality of computing resources is associated with a given messaging node and a given data node. The method manages transfer of a data set between the plurality of computing resources in association with the decentralized messaging network and the decentralized data network. Managing transfer of the data set comprises inserting a policy file into the decentralized data network specifying one or more policies for managing the transfer of the data set and inserting a message into the decentralized messaging network instructing implementation of the one or more policies.

U.S. Pat. No. 10,445,698 for System and method for forming, storing, managing, and executing contracts by inventor Hunn, filed Jun. 30, 2017 and issued Oct. 15, 2019, is directed to a system and method for computable contracts that includes a contract management system accessible by involved parties, managing a formation stage of a contract document by obtaining object components, assembling a contract object graph from the object components, and committing the contract object graph to post formation execution; and in an execution environment during a post-formation stage, executing the contract object graph where instances of execution include receiving a contract state update, and appending at least one update object component to the contract object graph in accordance with the contract state update. Variations of the system and method may apply peer-to-peer negotiation and execution, use a cryptographic directed acyclic contract object graph, and/or interface with distributed ledgers.

U.S. Patent Publication No. 20200153786 for Mapping database system for use with content chunks and methods of routing to content in an IP network by inventors Ward, et al., filed Apr. 17, 2017 and published May 14, 2020, is directed to method of retrieving content in an Internet Protocol version 6 (IPv6) network, including receiving from a network node a lookup request associated with content at a server comprising a mapping database. A response is generated including an IPv6 address, the IPv6 address comprising a content identifier and an indication of a location of the content. The response is transmitted to the network node. A method including receiving at a mapping database a lookup request associated with content and returning a text record comprising an ordered list of addresses for use in segment routing to the content is also described.

U.S. Patent Publication No. 20180331832 for Cryptographic Transactions System by inventor Pulsifer, filed Nov. 4, 2016 and published Nov. 15, 2018, is directed to a system for processing transactions with a cryptographic currency. The system uses a blockchain protocol as a public record of transactions to ensure only valid tokens can be used as transaction inputs, and that they can be used only once. Witnesses assemble transactions into a blockchain. Once enough witnesses confirm a block, it becomes a permanent and indelible part of the blockchain.

U.S. Pat. No. 10,559,202 for Ubiquitous visual computing witness by inventors Yang, et al., filed Jun. 8, 2018 and issued Feb. 11, 2020, is directed to an apparatus comprises a memory and a processor. The memory is to store sensor data captured by one or more sensors associated with a first device. Further, the processor comprises circuitry to: access the sensor data captured by the one or more sensors associated with the first device; determine that an incident occurred within a vicinity of the first device; identify a first collection of sensor data associated with the incident, wherein the first collection of sensor data is identified from the sensor data captured by the one or more sensors; preserve, on the memory, the first collection of sensor data associated with the incident; and notify one or more second devices of the incident, wherein the one or more second devices are located within the vicinity of the first device.

U.S. Pat. No. 9,104,326 for Scalable block data storage using content addressing by inventors Frank, et al., filed Nov. 15, 2010 and issued Aug. 11, 2015, is directed to a device for scalable block data storage and retrieval that uses content addressing. Data storage devices store data blocks, and are connected over a network to computing modules. The modules comprise control modules and data modules and carry out content addressing for both storage and retrieval. The network defines separate control paths via the control modules and data paths via the data modules.

U.S. Patent Publication No. 20190386995 for Apparatus, system and method to limit access to open networks by requiring the consensus of pre-existing nodes to admit candidate nodes by inventors Chafe, et al., filed Jun. 12, 2019 and published Dec. 19, 2019, is directed to systems and methods govern participation in and enforce a limit on the number of nodes that can participate in a cryptocurrency or other distributed computing network. Unlike other approaches, systems and methods herein do not require excessive use of resources. Admission of a node to a network is governed by the consensus of pre-existing nodes using a process or physical characteristic of the candidate node to determine its eligibility. One instantiation uses physical location as the unique physical characteristic, with a distance constraint to force geographic separation between nodes. Another uses signal response time over the network as a proxy for distance, relying on the fact that network nodes cannot respond to an interrogation before it is received. Combined with an appropriate time constraint, this enables network space to be used as an analog for geographic space, despite the fact that network transmission speeds and paths are variable.

U.S. Patent Publication No. 20190036764 for Event notification in interconnected content-addressable storage systems by inventors Canessa, et al., filed Jan. 24, 2018 and published Jan. 31, 2019, is directed to a seamless cloud of storage. This storage may be content-addressable storage. An end application may or may not be exposed to the fact that content-addressable storage is used. The publication discloses providing event notification, which may allow applications or users to subscribe to particular events (such as storage of an X-ray by a particular entity). The publication also discloses providing for a shared archive. A shared archive may provide homogeneous access to medical data, etc. that was previously stored into the CAS cloud by heterogeneous applications, varied data types, etc. Additionally, the patent discloses the creation and distribution of virtual packages. For example, a user may create a virtual package for all images related to a patient so that she may have a virtual package of all of her medical data to present to a referring physician.

U.S. Patent Publication No. 20200125604 for System and methods for metadata management in content addressable storage by inventors Canessa, et al., filed Oct. 24, 2019 and published Apr. 23, 2019, is directed to a content addressable storage (CAS) system that allows a user to request, either through an application server or directly to one or more CAS servers, files and content related to a query. The publication discloses that content can be discovered by searching previously-stored metadata related to each file at the content addressable storage server. The search can also be replicated across multiple content addressable storage servers in order to obtain varied results and redundant results. Duplicate results may be flagged or omitted, and the results are returned to the requester.

U.S. Pat. No. 9,880,756 for Successive data fingerprinting for copy accuracy assurance by inventors Mutalik, et al., filed Mar. 10, 2015 and issued Jan. 30, 2018, is directed to systems and methods for checking the data integrity of a data object copied between storage pools in a storage system by comparing data fingerprints of data objects, by scheduling a series of successive copy operations over time for copying a data object from a source data store to a target data store; generating a partial fingerprint of the data object at the source data store using a data fingerprinting operation that creates a fingerprint from a subset of data of the data object; sending the partial fingerprint of the data object to the target data store; sending any new data contents for the data object to the target data store; and creating a partial fingerprint of the data object at the target data store and comparing it to the partial fingerprint sent to the target data store to determine if they differ.

U.S. Pat. No. 9,904,603 for Successive data fingerprinting for copy accuracy assurance by inventors Mutalik, et al., filed Nov. 18, 2014 and issued Feb. 27, 2018, is directed to systems and methods for checking data integrity of a data object copied between storage pools in a storage system by comparing data samples copied from data objects. A series of successive copy operations are scheduled over time for copying a data object from a source data store to a target data store. A first data sample is generated based on a sampling scheme comprising an offset and a period. A second data sample is generated using a similar sampling scheme. The blocks of data in the first data sample and the second data sample are compared to determine if they differ to thereby indicate that the data object at the target store differs from the corresponding data object at the source data store.

SUMMARY OF THE INVENTION

The present invention relates to data integrity and authentication, and more specifically to a data protocol providing notarization of data between two or more nodes on a content-addressable peer-to-peer storage network.

It is an object of this invention to provide a distributed service providing notarization of data between two or more nodes on a content-addressed peer-to-peer network.

In one embodiment, the present invention provides a method of providing notarization on a content-addressable peer-to-peer storage network including providing a plurality of nodes, wherein each of the plurality of nodes is connected to at least one other node, a first node of the plurality of nodes generating at least one new data block populated with data, signing the data with a signature, and appending the signature to the at least one new data block, hashing the data using an algorithm, thereby creating a hash of the data, signing the hash of the data using an encoded digital signature and appending the encoded digital signature to the at least one new data block, triggering an event to an event handler and sending a signature request to a randomly selected set of peer nodes including the hash of the data, each of the randomly selected set of peer nodes extracting the hash of the data and signing the hash of the data using a peer encoded digital signature, thereby creating a peer signed hash of the data, each of the randomly selected set of peer nodes sending the peer signed hash of the data to the event handler, validating the peer encoded digital signature, the first node appending the peer encoded digital signature to the at least one new data block for each of the randomly selected set of peer nodes, generating a block identification by hashing the at least one new data block with the peer encoded digital signature from each of the randomly selected set of peer nodes, and gossiping existence of the at least one new data block to adjacent nodes.

In another embodiment, the present invention provides a method of providing notarization on a content-addressable peer-to-peer storage network including providing a plurality of nodes, wherein each of the plurality of nodes is connected to at least one other node, a first node of the plurality of nodes generating at least one new data block populated with data, signing the data with a signature, and appending the signature to the at least one new data block, hashing the data using an algorithm, thereby creating a hash of the data, signing the hash of the data using an encoded digital signature and appending the encoded digital signature to the at least one new data block, triggering an event to an event handler and sending a signature request to a randomly selected set of peer nodes including the hash of the data, each of the randomly selected set of peer nodes extracting the hash of the data and signing the hash of the data using a peer encoded digital signature, thereby creating a peer signed hash of the data, each of the randomly selected set of peer nodes sending the peer signed hash of the data to the event handler, the event handler validating the peer encoded digital signature, the first node validating the peer encoded digital signature and appending the peer encoded digital signature to the at least one new data block for each of the randomly selected set of peer nodes, generating a block identification by hashing the at least one new data block with the peer encoded digital signature from each of the randomly selected set of peer nodes, and the event handler gossiping existence of the at least one new data block to adjacent nodes.

In yet another embodiment, the present invention provides a system for providing notarization on a content-addressable peer-to-peer storage network including a plurality of nodes, wherein each of the plurality of nodes is connected to at least one other node, wherein a first node of the plurality of nodes is operable to generate at least one new data block populated with data and sign the data with a signature, wherein the signature is appended to the at least one new data block, wherein the first node is operable to hash the data using an algorithm, thereby creating a hash of the data, wherein the first node is operable to sign the hash of the data using an encoded digital signature and append the encoded digital signature to the at least one new data block, wherein the first node is operable to trigger an event to an event handler, wherein the event handler is operable to send a signature request to a randomly selected set of peer nodes including the hash of the data, wherein each of the randomly selected set of peer nodes is operable to extract the hash of the data and sign the hash of the data using a peer encoded digital signature, thereby creating a peer signed hash of the data, wherein each of the randomly selected set of peer nodes is operable to send the peer signed hash of the data to the event handler, wherein the first node is operable to validate the peer encoded digital signature and append the peer encoded digital signature to the at least one new data block for each of the randomly selected set of peer nodes, wherein the first node is operable to generate a block identification by hashing the at least one new data block with the peer encoded digital signature from each of the randomly selected set of peer nodes, and wherein the event handler is operable to gossip existence of the at least one new data block to adjacent nodes.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 8 illustrates an example block that consists of a data structure together with its cryptographic hash.

DETAILED DESCRIPTION

Figure 1:
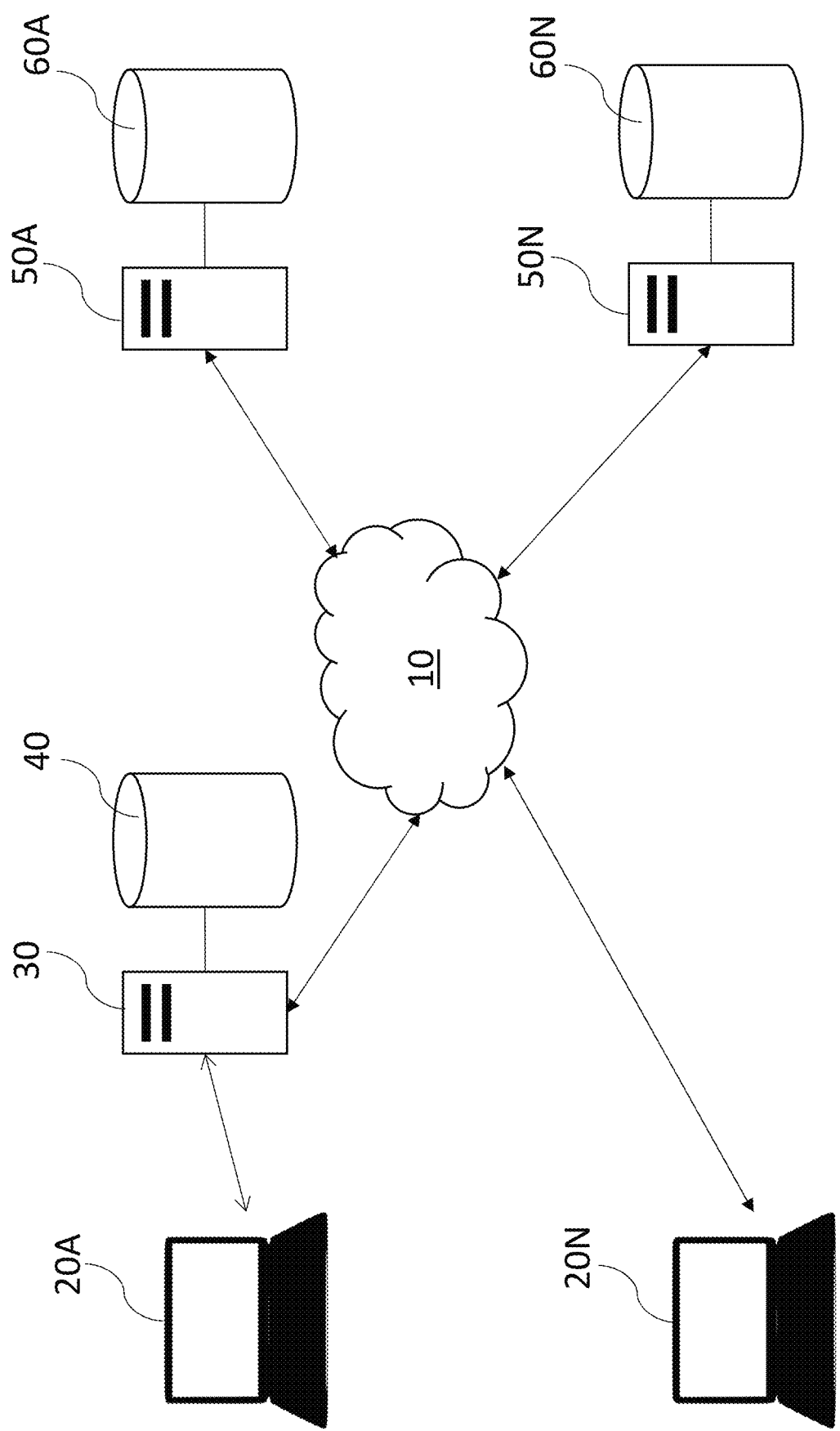
FIG. 1 illustrates a block diagram of one embodiment of a content addressable storage system.

The present invention relates to data authentication and integrity, and more specifically to a data protocol providing notarization of data between two or more nodes on a content-addressable peer-to-peer storage network.

In one embodiment, the present invention provides a method of providing notarization on a content-addressable peer-to-peer storage network including providing a plurality of nodes, wherein each of the plurality of nodes is connected to at least one other node, a first node of the plurality of nodes generating at least one new data block populated with data, signing the data with a signature, and appending the signature to the at least one new data block, hashing the data using an algorithm, thereby creating a hash of the data, signing the hash of the data using an encoded digital signature and appending the encoded digital signature to the at least one new data block, triggering an event to an event handler and sending a signature request to a randomly selected set of peer nodes including the hash of the data, each of the randomly selected set of peer nodes extracting the hash of the data and signing the hash of the data using a peer encoded digital signature, thereby creating a peer signed hash of the data, each of the randomly selected set of peer nodes sending the peer signed hash of the data to the event handler, validating the peer encoded digital signature, the first node appending the peer encoded digital signature to the at least one new data block for each of the randomly selected set of peer nodes, generating a block identification by hashing the at least one new data block with the peer encoded digital signature from each of the randomly selected set of peer nodes, and gossiping existence of the at least one new data block to adjacent nodes. In one embodiment, the method further includes determining a quorum of the randomly selected set of peer nodes is present. In one embodiment, the method further includes one or more of the adjacent nodes requesting the at least one new data block from the first node. In one embodiment, the method further includes one or more of the adjacent nodes gossiping existence of the at least one new data block to at least one additional node. In one embodiment, the at least one new data block includes metadata, and wherein the metadata includes node information, at least one link to another data block, and/or a number of cryptographic signatures and node identities. In one embodiment, the method further includes configuring a number of peer nodes to form the randomly selected set of peer nodes. In one embodiment, the method further includes validating the peer encoded digital signature using a public key from each of the randomly selected set of peer nodes. In one embodiment, the at least one new data block includes a parent block and at least one child block. In one embodiment, a node of the plurality of nodes maintains a registry of the plurality of nodes in the form of data blocks, a registry of data blocks the node possesses or has learned from other nodes, and a number of data blocks which are persisted to the node. In one embodiment, the method further includes encrypting communication between nodes using public key cryptography. In one embodiment, one or more of the adjacent nodes is operable to purge at least one data block to store the at least one new data block.

In another embodiment, the present invention provides a method of providing notarization on a content-addressable peer-to-peer storage network including providing a plurality of nodes, wherein each of the plurality of nodes is connected to at least one other node, a first node of the plurality of nodes generating at least one new data block populated with data, signing the data with a signature, and appending the signature to the at least one new data block, hashing the data using an algorithm, thereby creating a hash of the data, signing the hash of the data using an encoded digital signature and appending the encoded digital signature to the at least one new data block, triggering an event to an event handler and sending a signature request to a randomly selected set of peer nodes including the hash of the data, each of the randomly selected set of peer nodes extracting the hash of the data and signing the hash of the data using a peer encoded digital signature, thereby creating a peer signed hash of the data, each of the randomly selected set of peer nodes sending the peer signed hash of the data to the event handler, the event handler validating the peer encoded digital signature, the first node validating the peer encoded digital signature and appending the peer encoded digital signature to the at least one new data block for each of the randomly selected set of peer nodes, generating a block identification by hashing the at least one new data block with the peer encoded digital signature from each of the randomly selected set of peer nodes, and the event handler gossiping existence of the at least one new data block to adjacent nodes.

In yet another embodiment, the present invention provides a system for providing notarization on a content-addressable peer-to-peer storage network including a plurality of nodes, wherein each of the plurality of nodes is connected to at least one other node, wherein a first node of the plurality of nodes is operable to generate at least one new data block populated with data and sign the data with a signature, wherein the signature is appended to the at least one new data block, wherein the first node is operable to hash the data using an algorithm, thereby creating a hash of the data, wherein the first node is operable to sign the hash of the data using an encoded digital signature and append the encoded digital signature to the at least one new data block, wherein the first node is operable to trigger an event to an event handler, wherein the event handler is operable to send a signature request to a randomly selected set of peer nodes including the hash of the data, wherein each of the randomly selected set of peer nodes is operable to extract the hash of the data and sign the hash of the data using a peer encoded digital signature, thereby creating a peer signed hash of the data, wherein each of the randomly selected set of peer nodes is operable to send the peer signed hash of the data to the event handler, wherein the first node is operable to validate the peer encoded digital signature and append the peer encoded digital signature to the at least one new data block for each of the randomly selected set of peer nodes, wherein the first node is operable to generate a block identification by hashing the at least one new data block with the peer encoded digital signature from each of the randomly selected set of peer nodes, and wherein the event handler is operable to gossip existence of the at least one new data block to adjacent nodes. In one embodiment, the at least one new data block includes metadata, and wherein the metadata includes node information, at least one link to another data block, and/or a number of cryptographic signatures and node identities. In one embodiment, a number of peer nodes to form the randomly selected set of peer nodes is configurable. In one embodiment, the encoded digital signature is an elliptic curve digital signature. In one embodiment, the peer encoded digital signature is validated using a public key from each of the randomly selected of peer nodes. In one embodiment, the at least one new data block includes a parent block and at least one child block. In one embodiment, a node of the plurality of nodes maintains a registry of the plurality of nodes in the form of data blocks, a registry of data blocks the node possesses or has learned from other nodes, and a number of data blocks which are persisted to the node. In one embodiment, communication between nodes is encrypted using public key cryptography.

The present invention provides a decentralized platform for building and operating distributed applications across a federation of ad-hoc and mobile environments at the far-edge of communication networks. The decentralized platform of the present invention simplifies distributed application development and operations, delivers near real-time performance for data processing and data fusion algorithms, and increases the security and integrity of distributed applications.

The present invention utilizes a distributed edge computing platform (sometimes referred to as "EDJX") to reduce latency and increase network throughput to Hypertext Transfer Protocol (HTTP) clients (edge devices) by locating server nodes in close proximity to edge devices. The edge platform of the present invention is operable to write, test, and deploy low-latency edge applications. The edge platform is further operable to execute serverless functions or otherwise retrieve data from the platform compute nodes located in close proximity to the client. The edge platform is Application Programming Interface (API) compatible with cloud infrastructures including, but not limited to, GOOGLE CLOUD PLATFORM, AMAZON WEB SERVICES (AWS), and MICROSOFT AZURE.

An edge device is any device which provides an entry point into enterprise or service provider core networks. Examples include, but are not limited to, routers, routing switches, integrated access devices (IADs), multiplexers, metropolitan area network (MAN) access devices, wide area network (WAN) access devices, IoT devices, sensors, industrial machines, personal computing devices, laptop computing devices, tablet computing devices, mobile computing devices, cameras, and any other device that produces and/or collects data.

The edge platform of the present invention overcomes current issues in the prior art, including latency and bandwidth limitations at the edge, by deploying serverless functions in close proximity to edge devices. The edge platform further enables edge devices to securely access and record data at the edge using blockchain technologies.

Advantageously, the present invention overcomes the operational deployment limitations of prior art edge clouds by incorporating the following: (1) serverless computing, (2) blockchain, (3) content addressing, and (4) conflict-free replicated data types.

A key aspect of serverless computing is functions. Functions are small, independent pieces of code that complete specific requests, providing developers with more operational flexibility and cost savings when building, deploying, and running applications. Serverless computing, also known as functions-as-a-service (FaaS), is a cloud computing execution model which dynamically manages the allocation of resources on-demand according to events. Serverless functions are instantiated just-in-time to respond to events within an environment (e.g., network requests) or the arrival or modification of data, and typically run to completion and then terminate, returning resources to the system. For building decentralized applications the serverless paradigm is nearly ideal, owing to a lack of infrastructure dependencies and artifacts. Virtualization solutions like virtual machines and containers provide excellent resource isolation, performance, and security. However, virtual machines and containers are managed entities requiring dedicated resources, orchestration, and configuration. As such, they are tightly coupled to the underlying infrastructure. Deploying applications in legacy virtualization systems necessarily means incorporating and accounting for infrastructure artifacts. Typically, this is accomplished through complex orchestration systems such as Kubernetes (open source). In contrast, in pure serverless environments, developers focus on the development of their functions in isolation, without respect to infrastructure, software libraries, or other dependencies. In effect, the system resolves such dependencies on behalf of the software, freeing developers from infrastructure management.

Although the term blockchain refers to a growing list of records, called blocks, which are linked cryptographically, more generally blockchain refers to an entire family of related Distributed Ledger Technologies (DLT) used to create and manage these complex distributed data structures. Namely, the DLT concepts like Merkle trees or hash trees, along with the related concept of a directed acyclic graph (DAG), and a number of new techniques for creating robust peer-to-peer networks, gossip dissemination of data, eventual consistency, and a host of other related concepts and learnings have been incorporated into the design and implementation of the platform. As security is a big concern for edge use cases, each serverless request is preferably validated by and recorded to a blockchain to create an immutable record of execution.

Referring to data by its content, rather than its location, is one of the most powerful concepts to emerge in distributed computing in the last decade. In content-addressed systems, a cryptographic checksum of the data is used as the address for the data, creating a self-validating scheme that assures data integrity. Rather than connecting to a location to request the data, content-addressed networks route the data to the location of the requestor, offloading protocol overhead to ad-hoc infrastructure.

In distributed computing, a conflict-free replicate data type (CRDT) is a data structure that is operable to be replicated across multiple computers, where the replicas are operable to be updated independently and concurrently without coordination between peers.

The platform of the present invention provides a content-addressed data network (sometimes referred to as "EdjNet"), which enables the transparent, opportunistic, and secure dissemination of data between nodes in a peer-to-peer network. The platform includes a peer-to-peer protocol that uses cryptographic identities, delegation of trust, and end-to-end encryption, to create a global namespace for self-validating data that runs transparently over IPv4 and/or IPv6 networks.

Nodes in the distributed edge computing platform (sometimes referred to as "EDJX nodes") are zero-configuration nodes, meaning the nodes are operable to acquire any configuration dynamically and on-the-fly from the ad-hoc environment. Consequently, all nodes are identical from a software stack and configuration point of view, removing the need for orchestration and configuration management.

Every node in the distributed edge computing platform exposes a number of protocol endpoints, based on network policy, to enable proximal cloud services: (1) HTTP and Hypertext Transfer Protocol Secure (HTTPS), (2) Message Queuing Telemetry Transport (MQTT), (3) Object Storage, and (4) Domain Name System (DNS).

HTTP and HTTPS services include, but are not limited to, request routing, rewriting, redirecting, and/or triggering serverless functions. The platform is preferably operable to perform proximity-based routing of HTTP and/or HTTPS requests to the closest content-addressed data network-enabled node. In one embodiment, the proximity-based routing is based on at least one proximity metric including, but not limited to, availability, performance, and/or other criteria. In one embodiment, the platform is operable to create global rewrite rules to transparently rewrite uniform resource identifiers (URIs). In one embodiment, the platform is operable to create global redirect rules to transparently redirect URIs. In one embodiment, the platform is operable to trigger serverless functions based on HTTP request, URI, etc.

MQTT services include, but are not limited to, global messaging and/or triggering serverless functions. In one embodiment, the platform is operable to extend MQTT across multiple geographic regions with no centralized messaging broker. In one embodiment, the platform is operable to trigger serverless functions based on MQTT events.

Object storage services include, but are not limited to, key-value storage, triggering serverless functions, durability, policies, and/or encryption. In one embodiment, the platform is operable to persist data using key-value storage under a single, global namespace over HTTP and HTTPS. In one embodiment, the platform is operable to trigger serverless functions based on creation, deletion, or updates to data objects. The platform preferably is operable to perform transparent and opportunistic replication of data ensuring durability through eventual consistency. In one embodiment, the platform controls access to data based on Identity and Access Management (IAM) policies which dynamically replicate. In one embodiment, the platform includes full end-to-end encryption of data in transit and at rest with optional encryption of payloads based on cryptographic identities tied to IAM policies.

DNS services include, but are not limited to, routing and/or delegating authority. In one embodiment, the platform responds to DNS requests using at least one DNS metric. In one embodiment, the at least one DNS metric includes, but is not limited to, geospatial proximity, performance, and/or availability. The platform is preferably operable to dynamically direct clients to edge nodes. In one embodiment, the platform is operable to delegate DNS authority to the content-addressed data network to disseminate DNS information and routing rules to the global network.

Content-addressed data network nodes coordinate dynamically to deliver cloud services at the far-edge of modern communication networks, across a range of hardware platforms (e.g., IoT, mobile, server, etc.). The content-addressed data network federates a diverse set of physical infrastructures to create a single, global data network, in which data is securely persisted and replicated with assured integrity. Working together, nodes n the distributed edge computing platform deliver cloud services over standard protocols and interfaces.

Advantageously, the distributed edge computing platform of the present invention provides increased responsiveness, improved agility, simplified operations and increased data integrity. The distributed edge computing platform enables proximal data processing and computation in order to reduce application latencies and increase responsiveness. Building decentralized applications with the distributed edge computing platform of the present invention enables near real-time data fusion and algorithms to work seamlessly across a plurality of connected devices.

Additionally, the distributed edge computing platform of the present invention helps developers build distributed applications at planet-scale. All serverless functions are stored on the content-addressed data network as content-addressed data blocks and opportunistically disseminated among the plurality of the content-addressed data network nodes. There is no software to deploy or maintain on edge computing nodes. As a result, deploying functions, cache purges, and/or rolling back or forward between versions of serverless functions are nearly instantaneous.

In a preferred embodiment, every node in the distributed edge computing platform is designed for zero-configuration and all nodes are essentially identical. In one embodiment, the distributed edge computing platform dynamically allocates and schedules resources based on individual node capabilities without operator intervention. Advantageously, this allows developers to focus on building critical functionality because there are no infrastructure dependencies or complex orchestration systems to manage.

The content-addressed data network of the present invention provides self-verification through CRDTs together with data notarization technology to increase the integrity of data, preventing the introduction of misleading or erroneous data (whether accidental or deliberate). The data notarization technology provides federated data for data authentication and integrity. As used herein, "notarization" refers to any authentication process provided by the present invention.

As previously described, in location-address storage systems, a unit of data is operable to be identified by a Uniform Resource Identifier (URI). In one embodiment, the URI includes the DNS network name or internet protocol (IP) address of the storage device, as well as the location of the data on the storage device. This means that resources necessarily end up being centralized on a server or on a set of servers on the Internet. This also means that the party who owns the server has ultimate control over the data in question.

It is difficult to make guarantees about the durability or the integrity of data. On a centralized infrastructure, like the cloud, this is done by creating multiple replicas of the data across multiple physical servers and locations. Additionally, when resources are centralized, the integrity of the data itself is only as reliable as the infrastructure hosting the resource. When a resource is located by location, there is no inherent guarantee that the resource contains the expected data, or that the data in question has not been tampered with by a third party.

Furthermore, the resource's location may not be optimal for a particular purpose. For example, the resource may be on the set of a remote server that is too latent or without enough bandwidth.

One solution is to change the way that resources are addressed. Resources can be located based on a unique identifier and the network can bring content to users, rather than the user directing themselves to the location of the data. This is known as content-based addressing.

In content-based addressing schemes, resources are located by a unique identifier that has a mathematical relationship to the content. For example, a cryptographic hash of the content or data itself is operable to be used as a resource identifier. Then, any server or infrastructure is operable to maintain a copy of the resource. A cryptographic checksum allows users to be certain that the data received is as intended.

Content-based addressing can be understood using a simple analogy. If an individual wants to retrieve a particular book from the library and asks for the particular book by title, and then the library gives the individual a street address of another library that has the particular book. The individual must then go to the other library and retrieve the book in question. This is location-based addressing.

Books are identified by an International Standard Book Number (ISBN) number. The ISBN number is uniquely associated with the title in question. In effect, it is content-based addressing. Anytime the ISBN number is requested, the particular book that is desired will be received.

If libraries used cryptographic checksums of books instead of ISBN numbers, users could also be certain that the content of the book had not changed since it was originally published. However, being certain that the data in question matches a cryptographic checksum does not guarantee data integrity. How do users know that a nefarious actor did not write a different book and give users the wrong checksum matching the nefarious actor's content (as in a man-in-the-middle attack)?

In the real world, whenever it is desired to guarantee the integrity of data, delegated hierarchies of trust are used. A practical example of a delegated hierarchy of trust is a notary public. With a notary public, a trusted entity (i.e., the government) maintains a registry of parties whose responsibility it is to witness certain data. When a notary is engaged, individuals present the notary with a piece of data and asks them to sign it using their delegated authority of trust. The notary affixes their seal to the original document, guaranteeing its authenticity.

In the digital world, similar needs exist. For example, a remote piece of equipment sitting at the edge of the network may want to persist data into the rest of the network. Users may want to trust the authenticity and integrity of this data, so that the users can use it to make better decisions, or decisions in real time that affect the status of the real world.

Additional information regarding edge computing systems is available in U.S. application Ser. No. 16/809,181, filed Mar. 4, 2020, U.S. application Ser. No. 16/831,047, filed Mar. 26, 2020, U.S. application Ser. No. 16/831,069, filed Mar. 26, 2020, U.S. Provisional Application No. 62/813,839, filed Mar. 5, 2019, U.S. Provisional Application No. 62/838,666, filed Apr. 25, 2019, U.S. Provisional Application No. 62/838,733, filed Apr. 25, 2019, and U.S. Provisional Application No. 62/930,282, filed Nov. 4, 2019, each of which is incorporated herein by reference in its entirety.

Additional information regarding content addressable storage and/or data integrity is available in U.S. Patent Publication No. 20190036764, U.S. Patent Publication No. 20200125604, U.S. Pat. Nos. 9,880,756, and 9,904,603, each of which is incorporated herein by reference in its entirety.

The distributed ledger is a distributed service that runs on each and every node of the peer-to-peer network. On the peer-to-peer network, each node is identified uniquely by a cryptographic hash that is generated from the node's public-key. In other words, nodes themselves use content-based addressing. In one embodiment, a node is initialized by creating a cryptographic key pair (i.e., public and private key). In another embodiment, the cryptographic key pair uses an Ed25519 digital signature. Keys are stored on persistent media and are not regenerated. In one embodiment, the node identity is a multihash of the public key encoded as base58. In another embodiment, the node identity uses a secure hash algorithm 2 (SHA-2) (e.g., SHA-256).

Nodes discover each other by broadcasting their unique identifiers to the local network, or otherwise registering themselves on a centralized registry that is predefined or discoverable. Nodes join the network by connecting to peer nodes, either in their local vicinity or by connecting to super nodes that are discoverable. Each node listens for MDNS queries for a host (e.g., 'edjx'). Nodes first search for peers on the local broadcast network by issuing a MDNS query for the host. The nodes are configured to reply to MDNS queries for the host unless they have already replied in a configurable time window. All hosts on the network observe the MDNS replies for the host, and add new peers to their peer lists for connection.

Bootstrap nodes are hosted by the host (e.g., edjx) or customers in their private environments. Bootstrap nodes are discovered by issuing a DNS query for text (TXT) records to the configured bootstrap domain. For example:

| | | | | |
|---|---|---|---|---|
| edjx.network. | 300 | IN | TXT | "edjx-bootstrap = 204.181.40.44" |
| edjx.network. | 300 | IN | TXT | "edjx-bootstrap = 190.11.20.191" |

Nodes connect first to peers on the local area network discovered through MDNS. The nodes optionally connect to at least one bootstrap node.

The connection negotiation sequence begins with a handshake. In one embodiment, the handshake is an elliptic curve Diffie-Hellman handshake. In another embodiment, the handshake uses an Ed25519 key pair. In yet another embodiment, the handshake uses authenticated encryption with associated data (AEAD). In one embodiment, the AEAD is AEAD advanced encryption standard (AES) 256. In still another embodiment, the handshake uses an Ed25519 key pair followed by AEAD AES 256. Each node enforces the handshake policy by rejecting peers that do not comply.

Nodes authenticate through the use of a pre-shared key after connection setup using an AUTH message. When a peer passes an invalid key to the AUTH message, the node hangs up the connection.

When nodes have successfully connected to appear and are authenticated, the nodes are eligible to send and receive protocol commands. The protocol commands include, but are not limited to, HAVE, WANT, PUT, GET, and SIGN.

After successful connection, peers begin by exchanging JOIN messages for topics the peers are interested in. The default topics include, but are not limited to, network related messages (NET) (e.g., ENTER, EXIT), messaging relating messages (MSG) (e.g., JOIN, LEAVE), application related messages, and/or data related messages (DAT) (e.g., WANT, HAVE). LEAVE messages allow a node to leave a topic. ENTER messages show that a peer nodeid has connected to the node. EXIT messages show that a peer nodeid has disconnected from the node.

Following transmission of JOINs to the peer, the peers exchange HAVE messages. HAVE messages are retransmitted to all connected peers. HAVE messages each consist of a multihash keys in the peer's datastore for a given block. After initial connection, HAVE messages are sent whenever a new block is added to a peer's datastore. HAVE messages are gossiped to all nodes from which a JOIN to DAT has been received.

Following transmission of HAVEs, the peers exchange WANT messages. These are blocks the peer is looking for. WANT messages are retransmitted to all peers. When a node receives a WANT message, it checks its datastore for a block with the associated key. When a key is found, the peer WHISPERs a HAVE message to the requesting node. WANT messages are gossiped to all nodes from which a JOIN to DAT has been received.

A GET message is a request for data stored at a key. A PUT message is a request to save data at a key. A STAT message is a status request for a key.

WHISPER messages are gossiped to peers from which an ENTER message for a connected node has been received. WHISPER messages are gossiped to peers from which a JOIN to NET has been received, and for which a route to nodeid is present.

SHOUT messages are gossiped to peers for whom a JOIN message has been received for a given topic. SHOUT messages are retransmitted to peers from which a JOIN message has been received for a given topic.

An ENTER message is gossiped to all peers whenever a connection is made to a new peer. ENTER messages that are received are retransmitted to all peers.

An EXIT message is gossiped to all peers whenever a connection to a peer is terminated. EXIT messages that are received are retransmitted to all peers.

Request-response messages are blocking messages to a given peer. Nodes handle routing messages to peers by initiating connections to the target peer. Because these messages may be blocked, in one embodiment, a new connection is initiated or a new connection is negotiated within the message for long running operations (e.g., PUT, GET, SIGN). In another embodiment, messages are WHISPERed or gossiped (e.g., GET, PUT) such that the network routes the messages to the destination node.

When a PING message is received, the node replies with a PONG to the peer. A PONG is sent in response to a PING message on a given connection to a peer.

A GET message sends the peer a block associated with key; otherwise, an empty response of size zero is sent. A STAT message sends the peer the (struct) stat of the block for a given key. A PUT message receives a block associated with a key from a peer unless HAVE block.

A SIGN key message requests a node sign (i.e., notarize) a block. The message contains the hash of a data the requestor wants to be signed. For example:
{
"Id": "string" //id of the request, usually a hash of the current data
"hash": "string"
}

When a SIGN message is received, a block associated with a key is looked for, and then the block is digitally signed using a private key. The SIGN message receives a SIGNED reply message. For example:
{
"Id": "string" //id of the request, usually a hash of the current data
"signature": "string"
"publicKeyBase58": "string"
}

Referring now to the drawings in general, the illustrations are for the purpose of describing one or more preferred embodiments of the invention and are not intended to limit the invention thereto.

As previously described, in a content-addressed storage (CAS) system, a unit of data is assigned a globally unique identifier which is derived from the content of the unit of data itself, and the unit of data is accessed using this unique identifier. In a decentralized content-addressed storage system, location information is exchanged dynamically between storage devices on a network, permitting autonomous ad-hoc access to the unit of data. For example, in one embodiment, the unit of data is provided as the input to a hashing function, the resulting hash of which is used as the content-address of the unit of data. The unit of data is retrieved by the content-addressed storage system from the physical location based on the content address, and the unit of data is provided to the requesting computer.

FIG. 1 illustrates a block diagram of one embodiment of a content addressable storage system. A plurality of devices (e.g., computers, servers, etc.) are connected via a network 10 (e.g., the Internet, an intranet, wired network, wireless network). The content addressable storage system includes a plurality of computers 20A-20N. A computer may connect directly to the network 10 (e.g., 20N), or a computer may be connected to the network 10 (e.g., 20A) via an application server 30. In one embodiment, the application server 30 is connected (e.g., wired, wirelessly) to an application database 40. The content addressable storage system includes a plurality of servers 40A-40N connected (e.g., wired, wirelessly) to a plurality of storage devices 50A-50N. The content addressable storage system is operable to store data to the plurality of storage devices 50A-50N. The data is accessed using a content addressing scheme.

Figure 2:
FIG. 2 illustrates an example of a content addressing scheme.

FIG. 2 illustrates an example of a content addressing scheme. The image is converted into raw data. A hash function (e.g., SHA256) takes the raw data and gives an output (i.e., the digest). The output (i.e., the digest) is then converted into a content identifier (CID). The image is operable to be retrieved by searching for the CID. Advantageously, the digest is unique. If a pixel is changed, the digest changes. This provides for a method of determining if the image has been tampered with. Additionally, the system provides security because only the image and CID are accessible to users.

Figure 3:
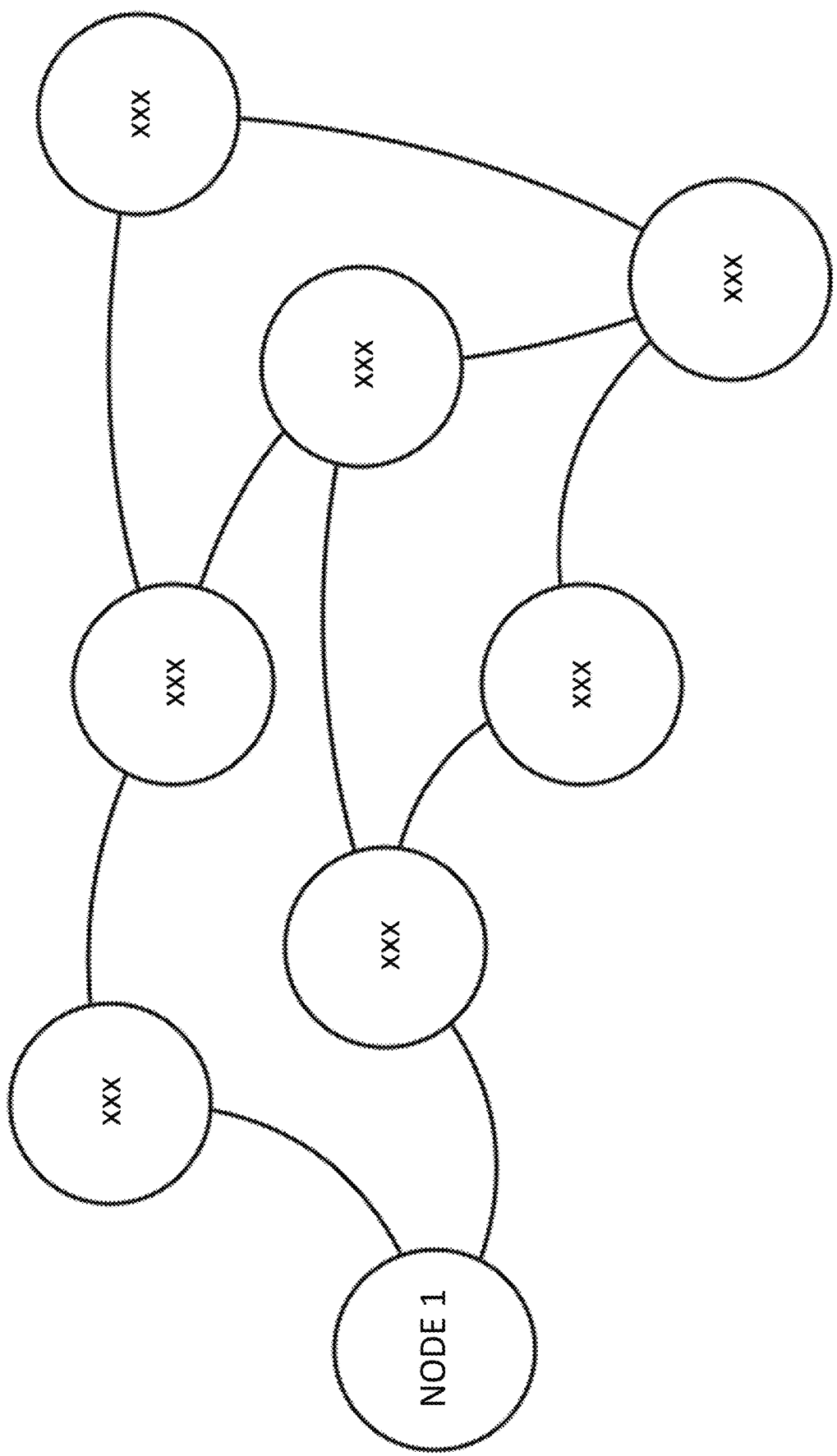
FIG. 3 illustrates a random peer-to-peer network topology.

FIG. 3 illustrates a random peer-to-peer network topology. The nodes form ad-hoc adjacency. Each node preferably has a unique global identifier. In a preferred embodiment, each node maintains a registry of all nodes in the form of data blocks, a registry of data blocks the node possesses or has learned from other nodes, and a number of data blocks which are persisted to the node. Nodes discover one another using a variety of methods, including, but not limited to, multicast Domain Name Server (DNS) and by establishing adjacency with predefined "super nodes". Communication between nodes is preferably encrypted using public key cryptography. One example of public key cryptography is S/Kademlia, which is detailed in I. Baumgart and S. Mies, "S/Kademlia: A practicable approach towards secure key-based routing," 2007 International Conference on Parallel and Distributed Systems, Hsinchu, 2007, pp. 1-8, doi: 10.1109/ICPADS.2007.4447808, which is hereby incorporated herein by reference in its entirety.

The nodes connect to each other and transfer objects called data blocks, which represent files and other data structures. When a node has established connections with a number of peers above a configurable threshold, it is eligible to generate new data blocks and disseminate the new data blocks through the network. Discovery and exchange of new data blocks is facilitated through a gossip-based protocol.

Advantageously, the nodes are operable to increase the integrity of the newly generated data blocks by having peer nodes "witness" the creation of new data blocks before they are disseminated to the gossip network. A new data block is instantiated that contains metadata about the data block and the data itself. The metadata includes node information, links to other data blocks (e.g., to facilitate the creation of complex data structures), and a number of cryptographic signatures and node identities.

Figure 4:
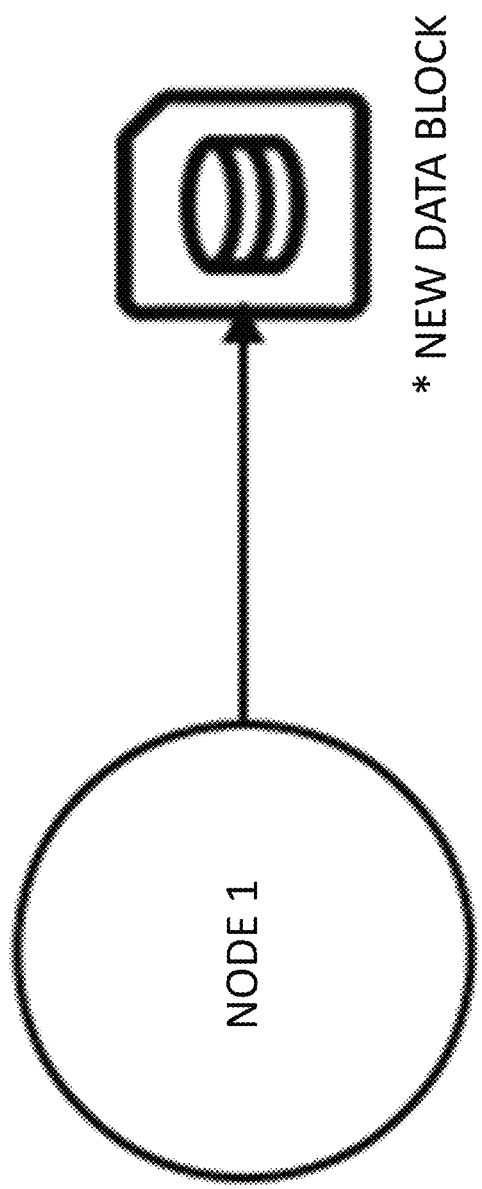
FIG. 4 illustrates generation of a new data block.
Figure 5:
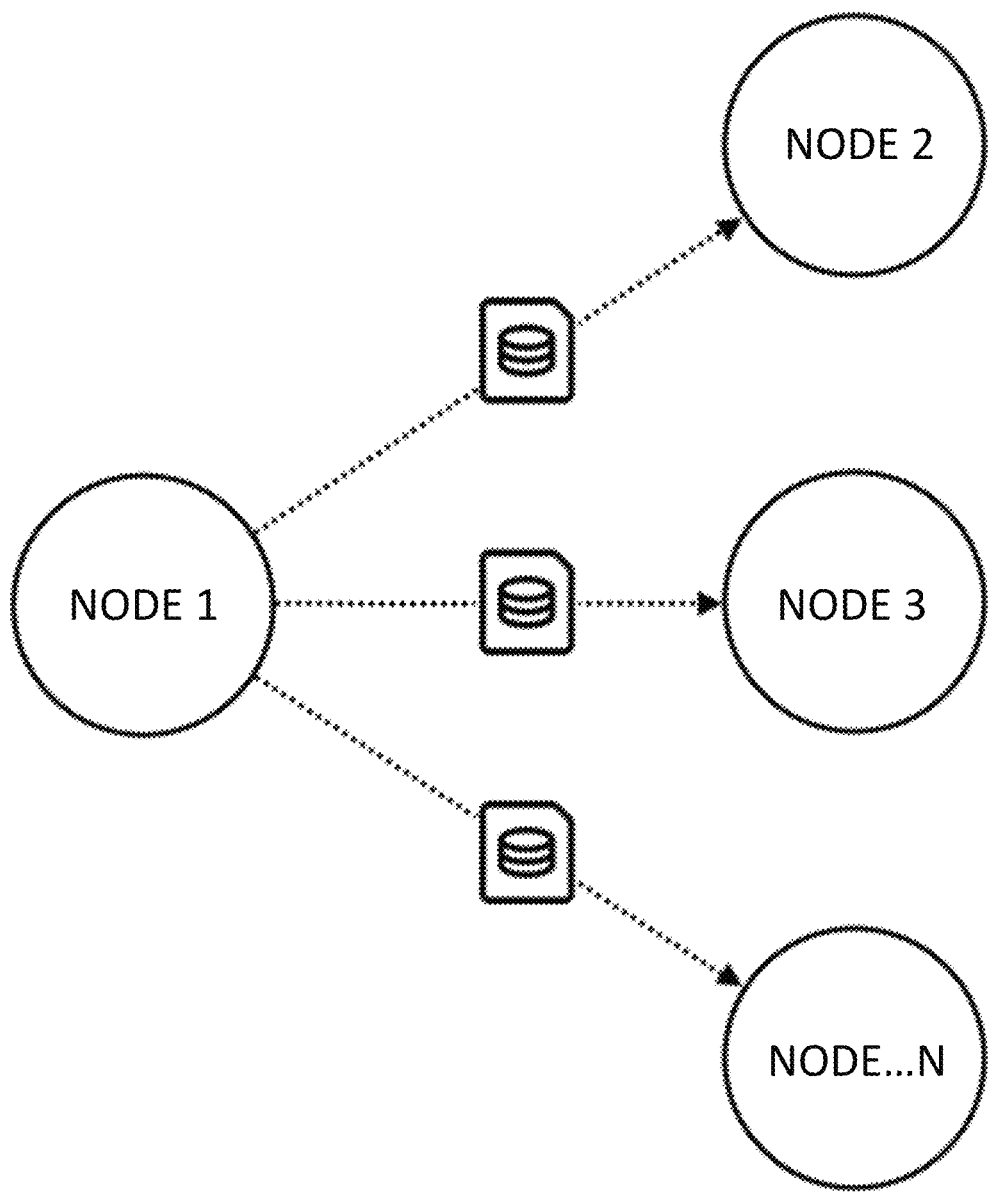
FIG. 5 illustrates a block diagram of one embodiment of a Phase 1 block generation and signature request.
Figure 6:
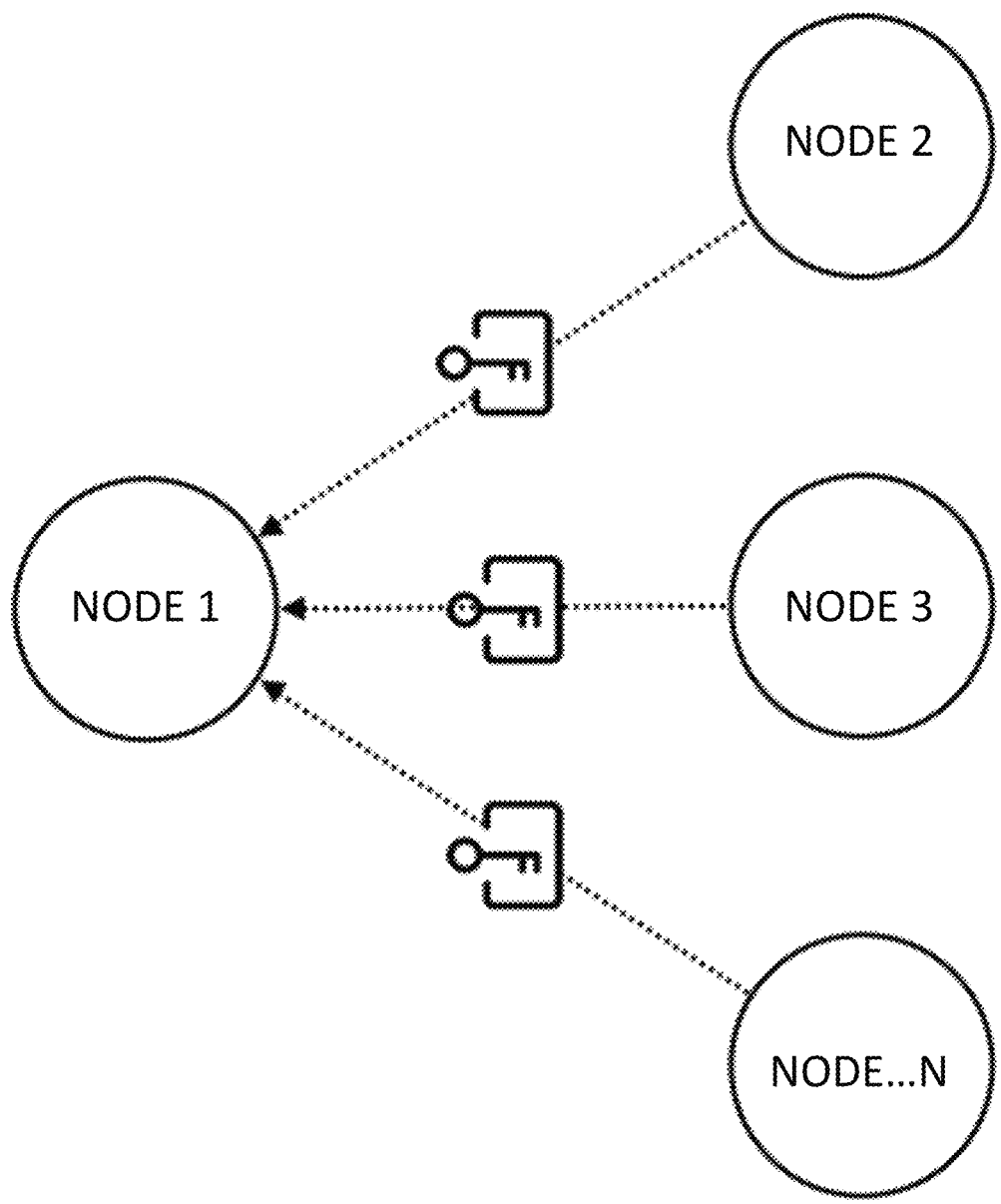
FIG. 6 illustrates a block diagram of one embodiment of a Phase 2 signature response.

Then a three-phase process begins when a node (e.g., Node 1) generates a new block (or the plurality of blocks that represent the data structure) in which are placed the data as shown in FIG. 4. Rather than gossiping the new data block to the network immediately in Phase 1, Node 1 increases the integrity of the data by having peer nodes witness the data block generation event. First, Node 1 randomly selects a configurable number of nodes (i.e., N nodes) from a set of connected peer nodes. A protocol command is sent to each node requesting the signature of the encapsulated data block as shown in FIG. 5. In Phase 2, each node responds to Node 1's signature request with an encoded digital signature of the data using its private key as shown in FIG. 6. In one embodiment, the encoded digital signature is an elliptic curve digital signature (e.g., Ed25519). Bernstein, D. J., Duif, N., Lange, T. et al. J Cryptogr Eng (2012) 2: 77. https://doi.org/10.1007/s13389-012-0027-1 details the Ed25519 digital signature and is hereby incorporated herein by reference in its entirety.

Figure 7:
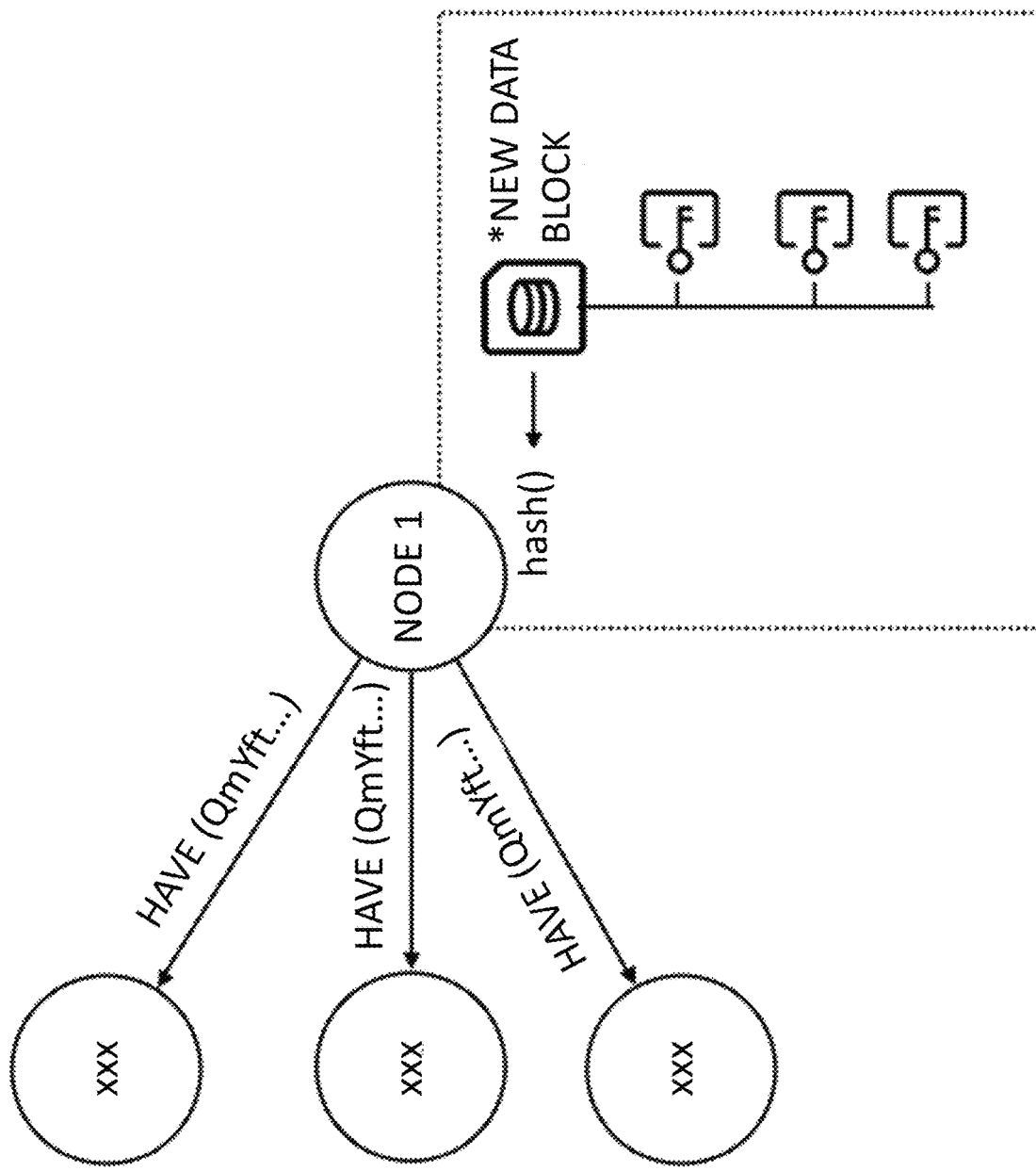
FIG. 7 illustrates a block diagram of one embodiment of a Phase 3 hash and gossip.

In Phase 3, Node 1 appends the digital signature from each witness node to the data block, then generates a cryptographic hash of the entire data block (e.g., including metadata, data, signatures, links), which is used as the identity of the block (i.e., content addressing). The block is then gossiped to a configurable number of peer nodes (e.g., N nodes) as shown in FIG. 7.

Each peer node in turn gossips the existence of the new data block, which is appended to each node's cache or registry of data blocks. Nodes that do not have the new data block are operable to request the block from Node 1 or from any node that stored the new data block. By default, nodes are "greedy" and attempt to retrieve new data blocks when the nodes learn about them. In the event of limited storage, greedy nodes are operable to purge at least one of the least recently used (LRU) data blocks in order to store the new data block. For example, a node purges a data block last accessed twelve months ago (i.e., an LRU data block) to store a new data block.

In one embodiment, a greedy node purges the at least one data block after a predetermined amount of time (e.g., one day, one week, one month, one year) has passed since the at least one data block was accessed. Additionally or alternatively, a percentage of storage capacity is monitored and a greedy node purges the at least one data block after a purging threshold storage level is reached (e.g., 50% capacity, 75% capacity, 80% capacity, 85% capacity, 90% capacity, 95% capacity). In another embodiment, a greedy node purges the at least one data block based on a size of the at least one data block and/or an age of the at least one data block. In one embodiment, the at least one data block is offloaded to another node and/or cloud storage.

A greedy node preferably has a storage capacity of at least 0.5 PB. In one embodiment, the storage capacity of the greedy node is operable to be increased as the storage capacity is approached. In a preferred embodiment, the greedy node sends a message to an administrator after a notification threshold storage level is reached (e.g., 50% capacity, 75% capacity, 80% capacity, 85% capacity, 90% capacity, 95% capacity). The notification threshold storage level is preferably smaller than the purging threshold storage level, allowing the administrator to assess the storage capacity issues on the greedy node.

FIG. 8 illustrates an example block that consists of a data structure together with its cryptographic hash.

Figure 9:
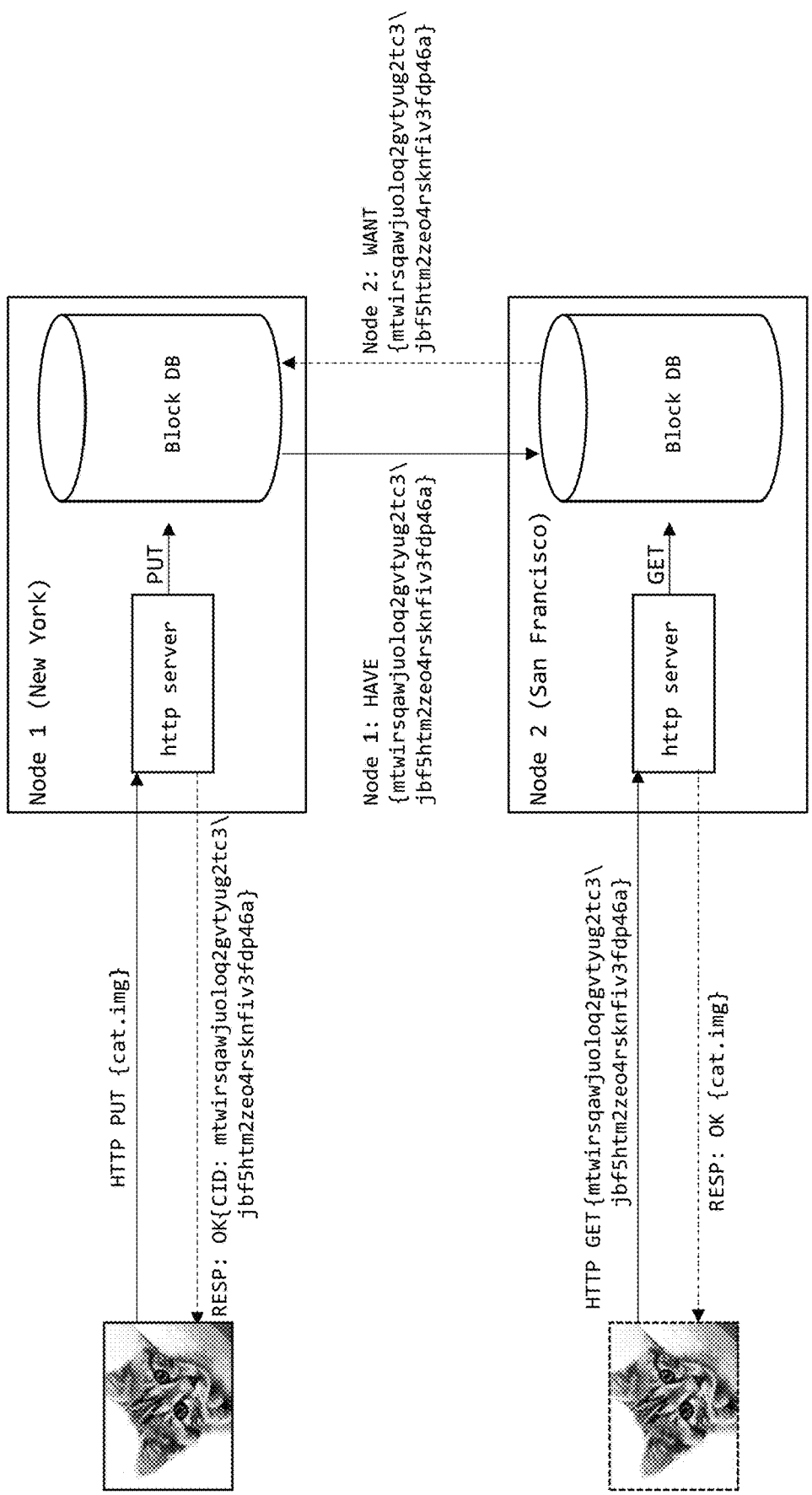
FIG. 9 illustrates an example of a PUT and a GET between two computers and two nodes.

FIG. 9 illustrates an example of a PUT and a GET between two computers and two nodes. A first computer (top) sends a PUT message regarding an image (i.e., cat.img) to an http server in Node 1, which is located in New York. The http server in Node 1 sends an OK response to the first computer with a CID and puts the image in a block database in Node 1 (e.g., via a PUT message). The block database in Node 1 sends a HAVE message to a block database in Node 2 with the CID. The block database in Node 2 then sends a WANT message to the block database in Node 1 with the CID. Thus, cat.img and the CID are stored in both the block database in Node 1 and the block database in Node 2.

A second computer (bottom) later sends a GET message with the CID to an http server in Node 2, which is located in San Francisco. The http server in Node 2 retrieves the image from the block database in Node 2 (e.g., via a GET message), and sends the image to the second computer with an OK response.

Figure 10:
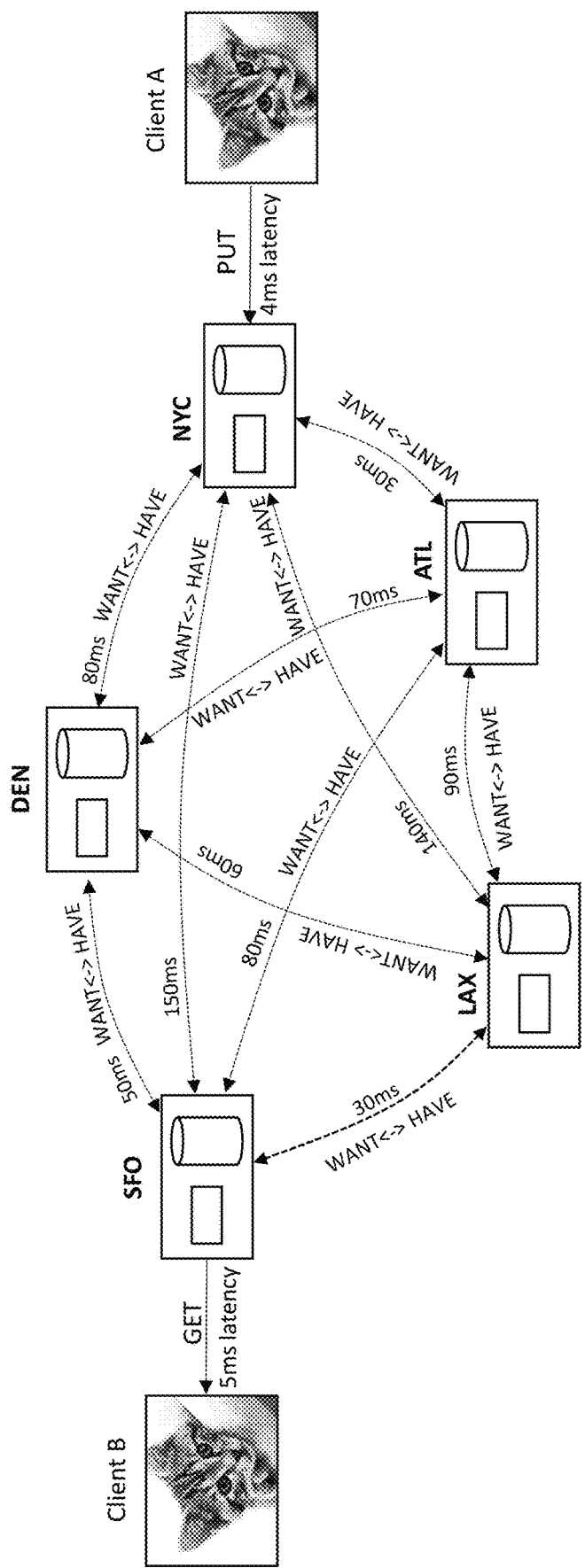
FIG. 10 illustrates an example of a PUT and a GET between two computers and a plurality of nodes.

FIG. 10 illustrates an example of a PUT and a GET between two computers and a plurality of nodes. This is similar to the example shown in FIG. 10, except there are a plurality of nodes. The plurality of nodes shown in FIG. 10 includes an NYC node, a DEN node, an ATL node, a LAX node, and an SFO node. A first computer (Client A) sends a PUT message regarding an image to the NYC node with a latency of 4 ms between the NYC node and the first computer. The NYC node sends a HAVE message with the CID to the DEN node, the ATL node, the LAX node, and the SFO node. The DEN node, the ATL node, the LAX node, and the SFO node each send a WANT message with the CID to the NYC node. There is a different latency between the NYC node the receiving node (e.g., 80 ms latency between the NYC node and the DEN node, 30 ms latency between the NYC node and the ATL node, 140 ms latency between the NYC node and the LAX node, and 150 ms latency between the NYC node and the SFO node).

The DEN node, the ATL node, the LAX node, and the SFO node then gossip the CID (e.g., via a HAVE message) to their connected nodes. For example, the DEN node sends a HAVE message with the CID to the ATL node, the LAX node, and the SFO node; the ATL sends a HAVE message with the CID to the DEN node, the LAX node, and the SFO node; and the LAX node sends a HAVE message with the CID to the DEN node, the ATL node, and the SFO node. Note that a direct path between two nodes is not necessarily the fastest path. For example, there is a lower latency traveling from the NYC node to the SFO node via the ATL node when compared to the direct route between the NYC and the SFO node. If the SFO node already has the image associated with the CID, the second computer is able to retrieve the image from the SFO node with a latency of 5 ms.

If the SFO node does not have the image associated with the CID (e.g., does not exist, gossip has not yet reached the SFO node), the SFO node contacts all connected nodes in parallel (e.g., the NYC node, the DEN node, the ATL node, the LAX node) with a WANT message to try to obtain the image. The SFO node then connects to a node that has the image associated with the CID that has the lowest latency to obtain the image.

Figure 11:
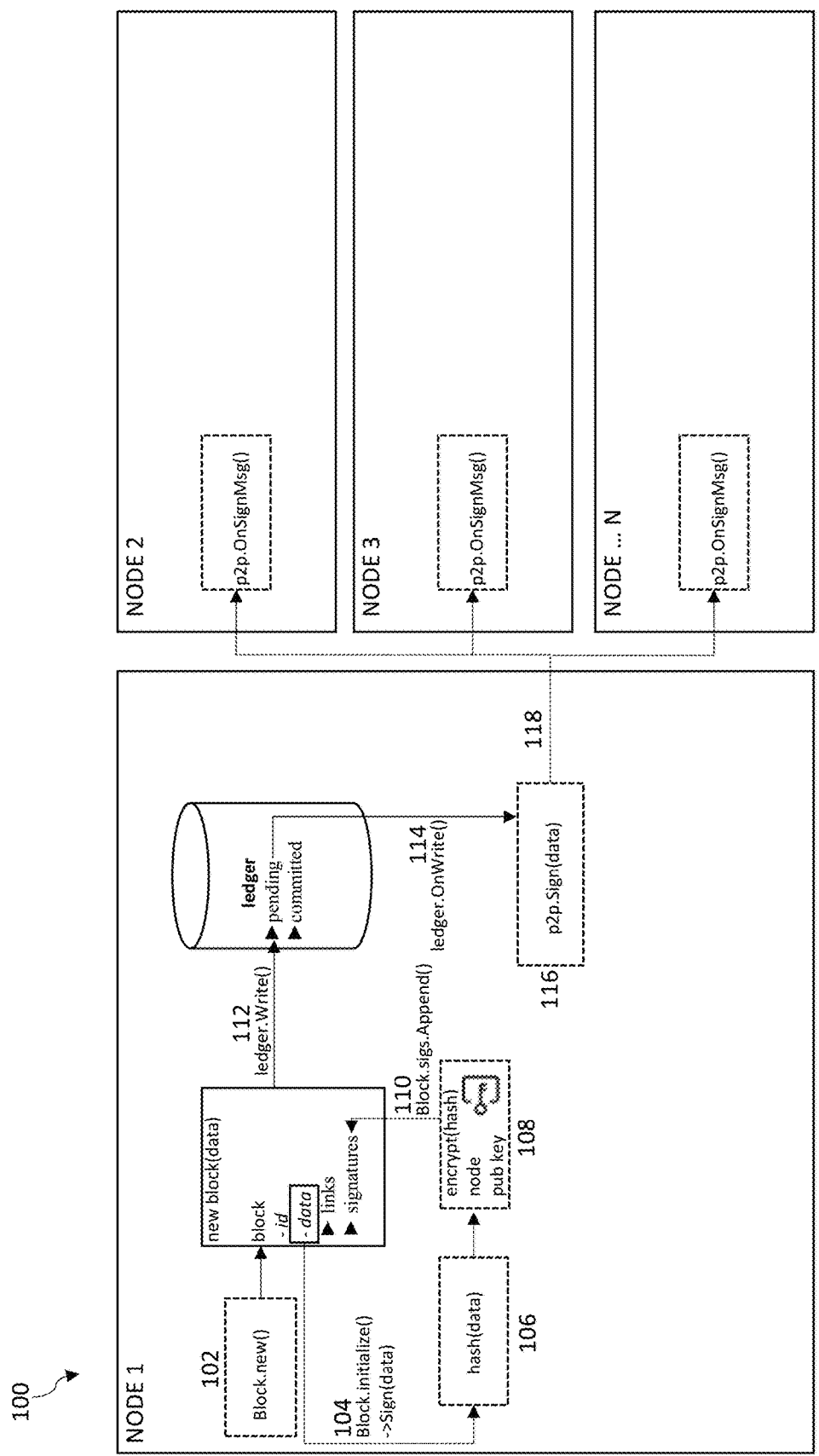
FIG. 11 illustrates one embodiment of Phase 1 of the commit process.

FIG. 11 illustrates one embodiment of Phase 1 of the commit process 100. In step 102, Node 1 generates a new data block that is populated with data. In step 104, the data is signed by the generating node (i.e., Node 1) and the signature is appended to the new data block signatures. In step 106, the data is hashed using a user-specified algorithm. In step 108, a hash of the data is signed using an encoded digital signature (e.g., Ed25519). In step 110, the encoded digital signature is appended to the new data block. In step 112, the new data block is written to a local ledger as pending. In step 114, the new data block commit is confirmed to the local ledger. In step 116, writing to the local ledger triggers an event to an event handler. In step 118, the event handler fires a signature request to a randomly selected set of peer nodes.

Figure 12:
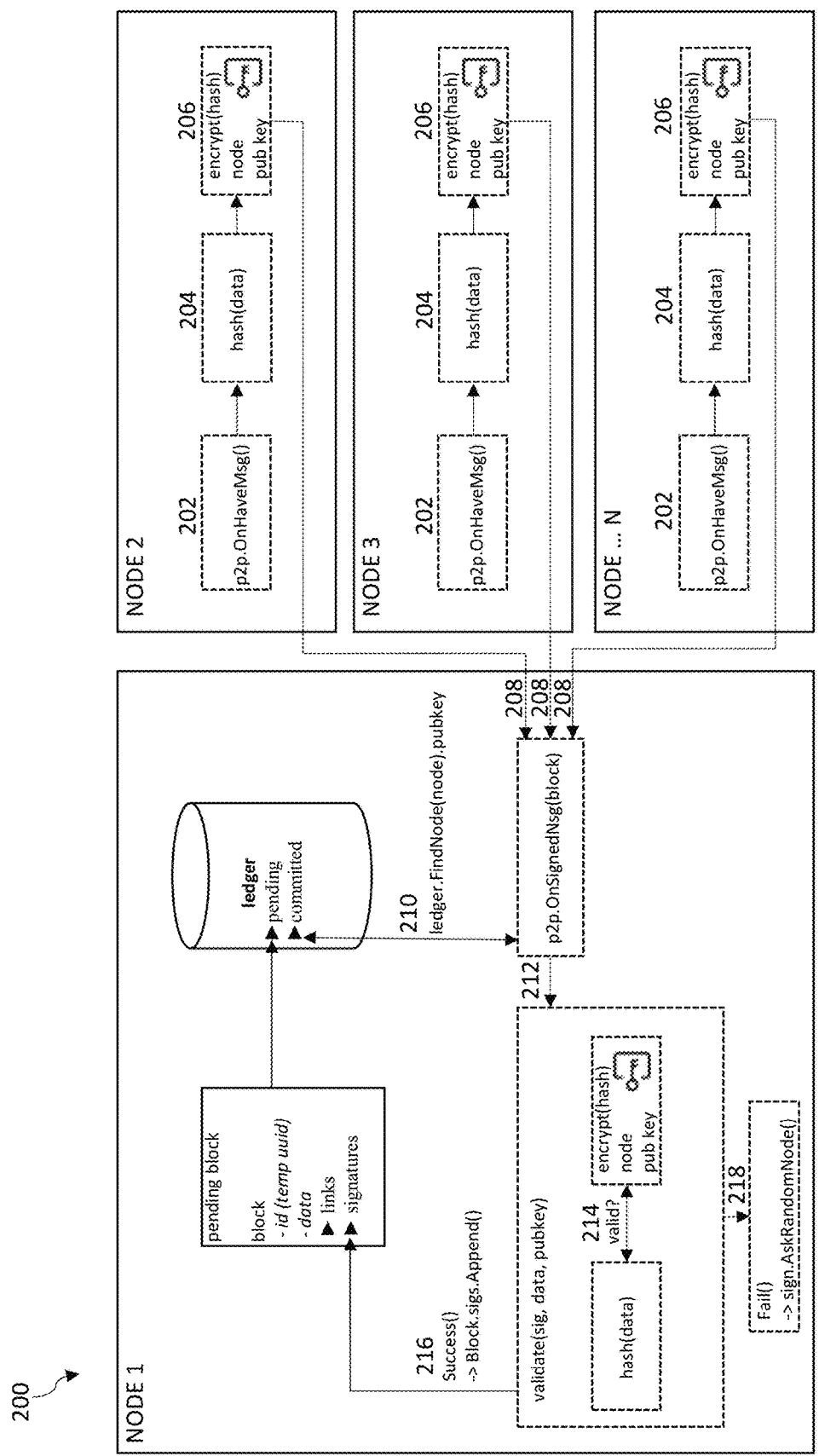
FIG. 12 illustrates one embodiment of Phase 2 of the commit process.

FIG. 12 illustrates one embodiment of Phase 2 of the commit process 200. In step 202, a node receives a signature request with a hash of the data. In step 204, the node extracts the hash from the message. In step 206, the node signs the hash using an encoded digital signature (e.g., Ed25519). Alternatively, the node encrypts the hash and encodes. In step 208, the node sends the signature to the event handler. In step 210, the event handler identifies the pending commit and the connection handler. In step 212, the event handler validates the signature using the remote node's public key. In step 214, the node attempts to validate the signature. In step 216, validation of the signature is successful and the signature is appended to the data block. In step 218, validation of the signature is not successful (i.e., fails) and Node 1 attempts to have another node sign or abandons the commit.

Figure 13:
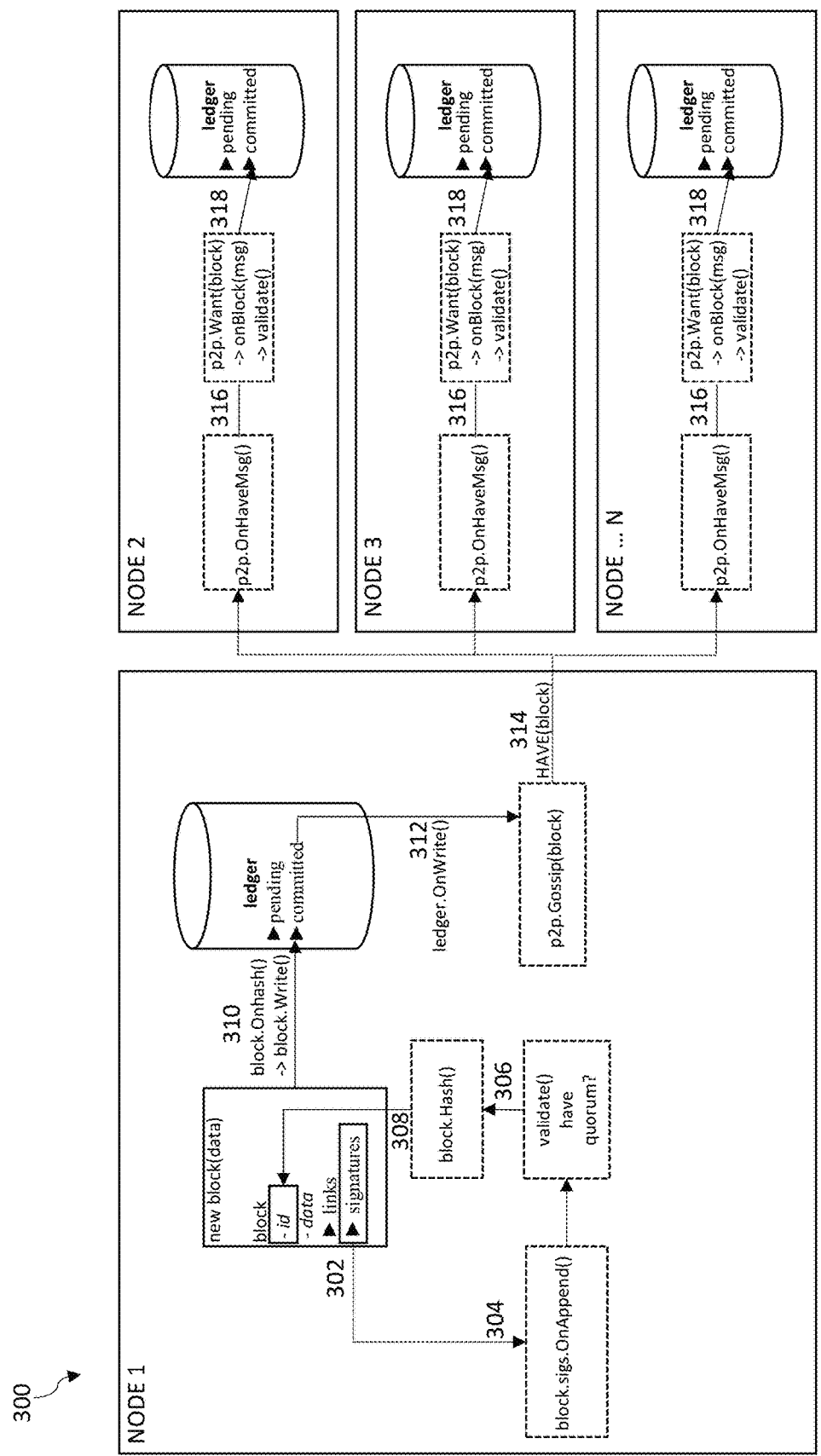
FIG. 13 illustrates one embodiment of Phase 3 of the commit process.

FIG. 13 illustrates one embodiment of Phase 3 of the commit process 300. In step 302, an append of the signatures of the block triggers an event. In step 304, the event handler is invoked. In step 306, the requestor determines if it has a quorum. The quorum is a configurable number of nodes (e.g., N nodes). In step 308, if the requestor has a quorum, it hashes the entire block to generate the block id. In step 310, the block update triggers an update event to the ledger where the block is deleted from the pending queue and added to the committed queue. In step 312, the update of the committed ledger triggers an event. In step 314, the event handler gossips the new block to adjacent nodes. In step 316, a node receives a HAVE message and replies with a WANT message with the id of the block. In step 318, the block is transmitted to the requesting node and saved to the committed ledger. This in turn triggers steps 312 and 314 on the requesting node.

The system is operable to break a large file into a plurality of blocks. In one embodiment, each block has a maximum size. In one embodiment, the maximum size is configurable. For example, a 1 MB file is broken into a plurality of 1 kB blocks. In a preferred embodiment, the plurality of blocks includes a parent block with links to all child blocks. Each child block includes an address of the parent block.

Advantageously, the notarized ledger of the present invention requires a digital signature and witness nodes prior to hashing the block. This provides data integrity. A subsequent requestor of the data knows that the correct file is received because it includes the digital signature. Any modification to the data results in a new CID. It is therefore impossible to thwart the data integrity of the block because a hacker does not know which connected nodes were used to witness a block because the witness nodes are selected at random. Because of the data integrity provided by the system, it is useful in both real time scenarios and to reconstruct an event.

Figure 14:
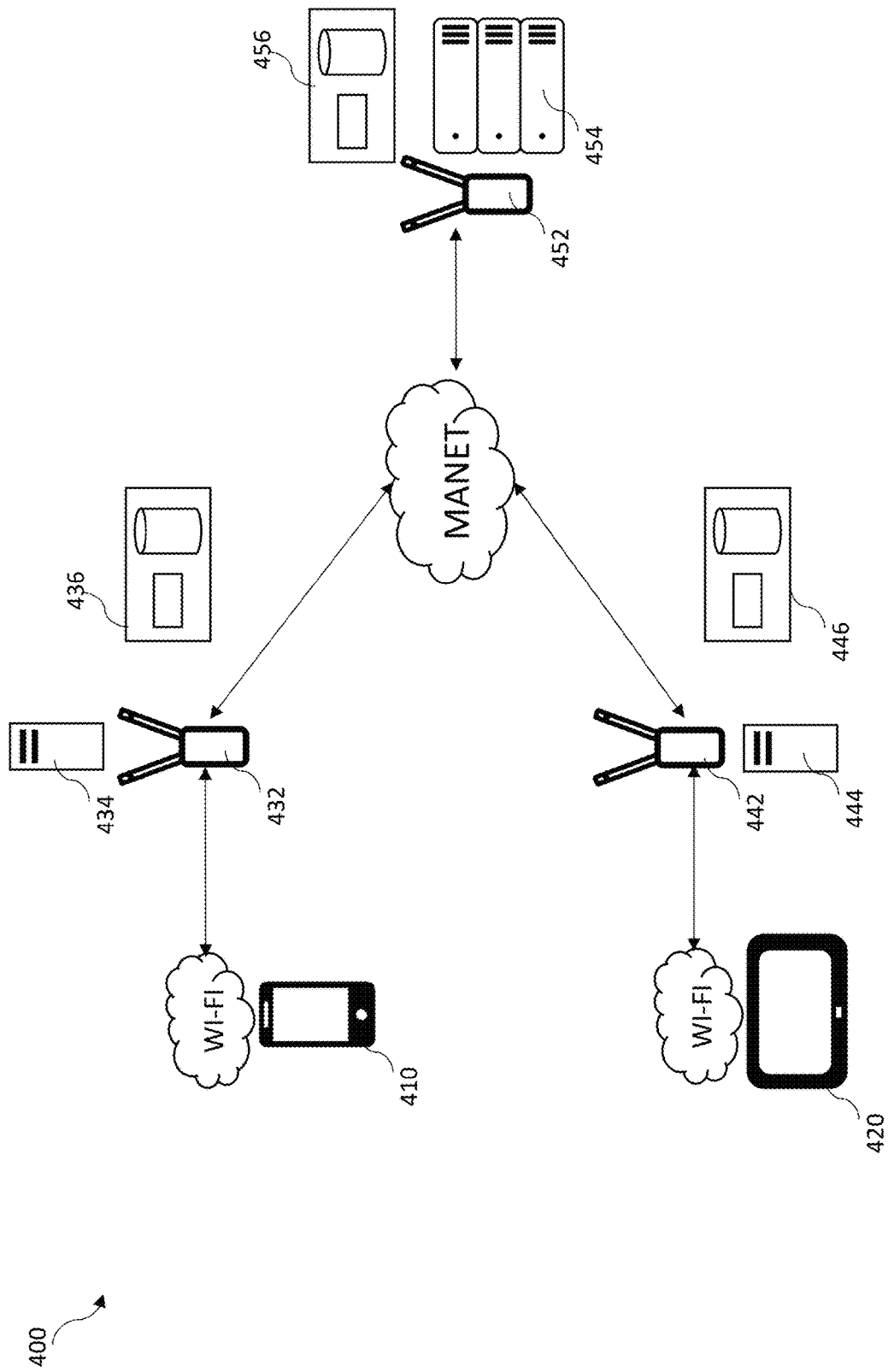
FIG. 14 illustrates an example of a mobile ad hoc network (MANET).

FIG. 14 illustrates an example of a mobile ad hoc network (MANET) 400 (e.g., used by troops). The MANET 400 includes at least one device, at least one radio, at least one computer, at least one node, and/or at least one server. In the example shown in FIG. 14, the MANET 400 includes a first device 410 (e.g., smartphone) and a second device 420 (e.g., tablet). The first device 410 is in network communication (e.g., WI-FI) with a first radio 432, a first computer 434, and/or a first node 436. The second device 420 is in network communication (e.g., WI-FI) with a second radio 442, a second computer 444, and/or a second node 446. The MANET 400 further includes a third radio 452, a server 454, and/or a third node 456. The first radio 432, the second radio 442, and the third radio 452 enable communication between the radio via the MANET 400. Although the MANET 400 is shown with three radios, three nodes, two computers, two devices, and one server, any number of radios, nodes, computers, devices, and/or servers are compatible with the present invention.

In one embodiment, one or more of the at least one computer and/or the at least one server includes an internal transceiver operable to communicate directly within the network, such that a separate radio is not required to communicate on the MANET. In a preferred embodiment, the at least one node is in wired and/or wireless communication with the at least one computer and/or the at least one server.

In a preferred embodiment, each of the at least one device is in communication with at least one sensor. In one embodiment, one or more of the at least one sensor is incorporated into the at least one device. Additionally or alternatively, one or more of the at least one sensor is in wireless and/or wired communication with the at least one device. The at least one sensor includes, but is not limited to, at least one noise sensor (e.g., a ballistic sensor), at least one range sensor, at least one elevation sensor, at least one altitude sensor, at least one camera (e.g., video, static), at least one environmental sensor (e.g., air quality, radiation, airborne chemicals, pressure, temperature, humidity, wind speed), and/or at least one physiological sensor. The at least one noise sensor is preferably operable to detect audible sound (e.g., 20 Hz-20,000 Hz) and/or inaudible sound (e.g., ultrasound). The at least one physiological sensor includes a heart rate sensor, a blood pressure sensor, a skin temperature sensor, a galvanic skin response sensor, a sweat sensor, an analyte sensor, a respiration sensor, and/or a pulse oximeter.

In one embodiment, the MANET 400 further includes at least one laser rangefinder and/or at least one ballistic solver (not shown). The at least one laser rangefinder and/or the at least one ballistic solver is operable to capture data including, but not limited to, a range of a target, an elevation, an altitude, and/or at least one environmental parameter (e.g., air quality, radiation, airborne chemicals, pressure, temperature, humidity, wind speed). Each of the at least one laser rangefinder and/or the at least one ballistic solver uses the captured data with stored ammunition data to calculate an aiming correction. The aiming correction is preferably delivered to at least one optical system (e.g., disturbed reticle of a digital optic system). The at least one optical system is preferably operable to communicate wirelessly over the MANET 400 and/or via a cabled connection (e.g., to the at least one device). The at least one laser rangefinder and/or the at least one ballistic solver is preferably operable to determine at least one location of at least one shooter. Advantageously, this system reduces operator errors and maintains situational awareness while allowing operators to keep eyes on targets and hands on weapons.

Figure 15:
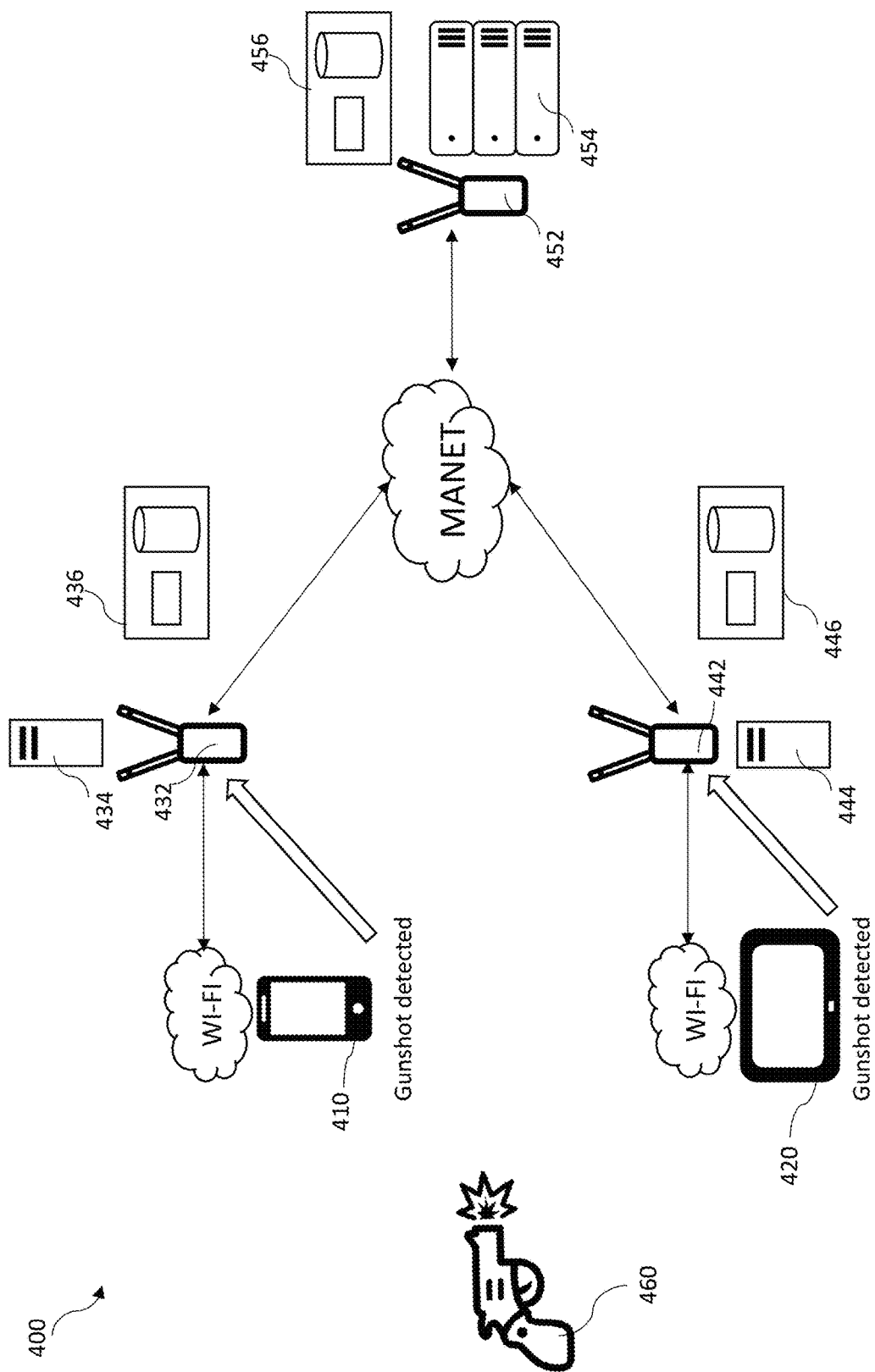
FIG. 15 illustrates the MANET of FIG. 14 with a gunshot detection scenario.

FIG. 15 illustrates the MANET 400 of FIG. 14 with a gunshot detection scenario. The first device 410 and the second device 420 detect a gunshot from a gun 460. The first device 410 sends first device data regarding the gunshot to the first radio 432, the first computer 434, and/or the first node 436. The second device 420 sends second device data regarding the gunshot to the second radio 432, the second computer 444, and/or the second node 446.

Figure 16:
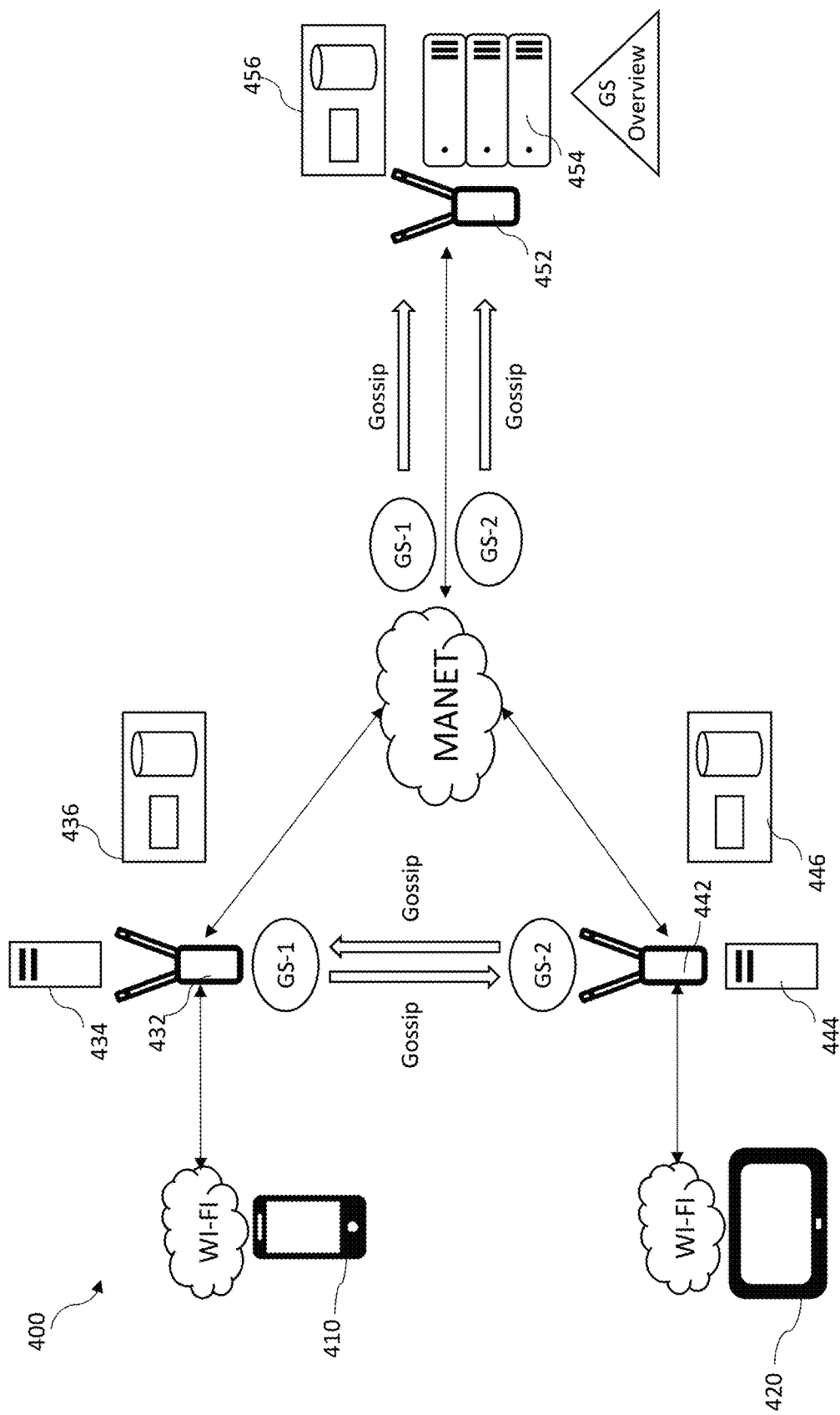
FIG. 16 continues the gunshot detection scenario of FIG. 15.

As shown in FIG. 16, the first computer 434 processes the first device data, thereby creating processed data GS-1. The second computer 444 processes the second device data, thereby creating processed data GS-2. GS-1 is stored in Node 1 436 and GS-2 is stored in Node 2 436. Node 1 436 gossips GS-1 to Node 2 446 and Node 3 456, and Node 2 446 gossips GS-2 to Node 1 436 and Node 3 456. Node 3 456 then processes GS-1 and GS-2, thereby creating GS Overview data.

Figure 17:
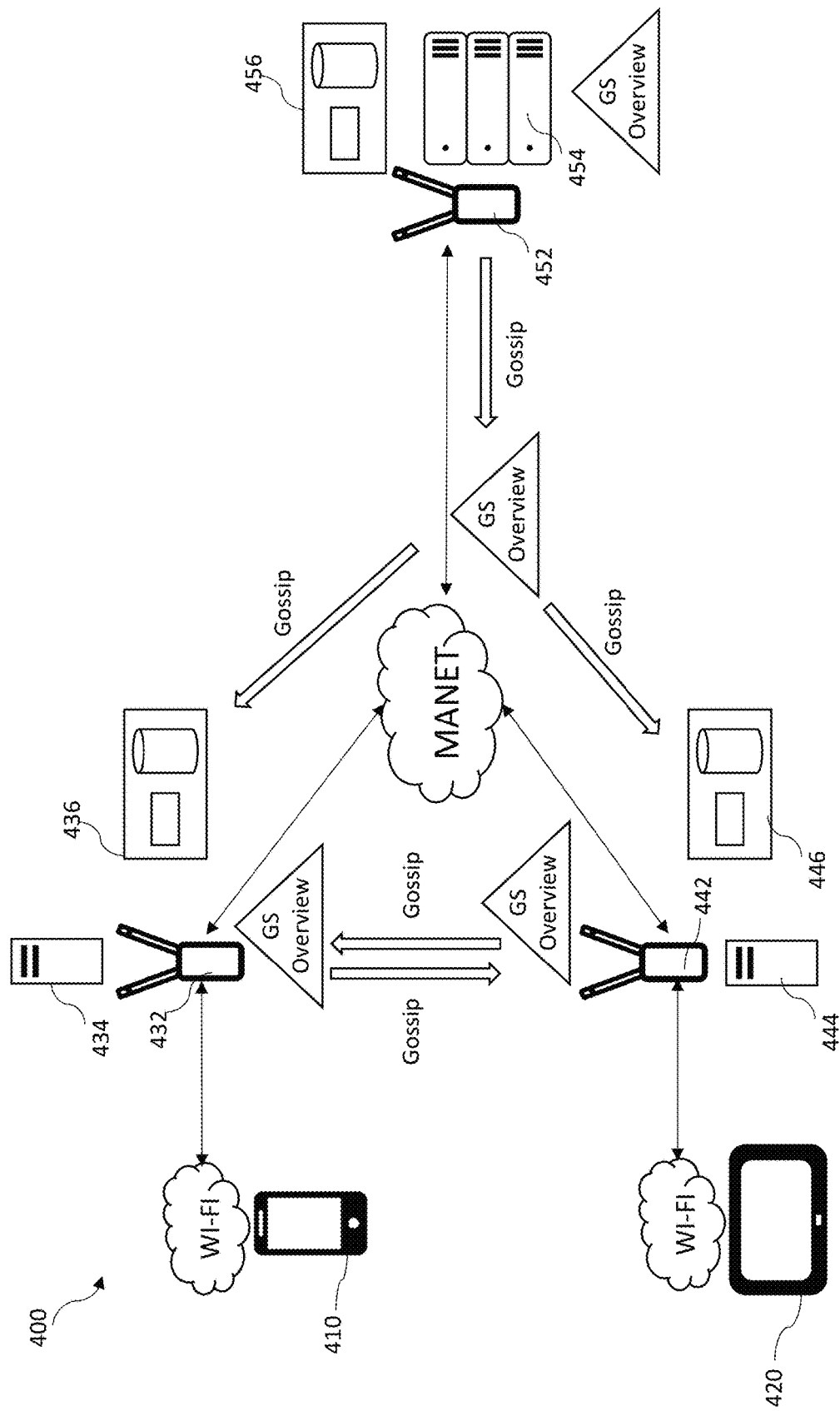
FIG. 17 continues the gunshot detection scenario of FIG. 16.

Node 3 456 then gossips the GS Overview data to Node 1 436 and Node 2 446 as shown in FIG. 17. Node 1 436 gossips the GS Overview data to Node 2 446, and Node 2 446 gossips the GS Overview data to Node 1 436. The gossip system ensures that Node 1 436, Node 2 446, and Node 3 456 each have a copy of GS-1, GS-2, and the GS Overview data. Further, this data is operable to be shared with planes, vehicles (e.g., tank, Humvee), command centers, etc. in the field.

The GS Overview data is operable to be used to determine at least one response to the gunshot. For example, the GS Overview data is transmitted to a first laser rangefinder and/or a first ballistic solver, which provides a first aiming correction for a first operator, a second laser rangefinder and/or a second ballistic solver, which provides a second aiming correction for a second operator, etc.

Advantageously, if there is an accusation that soldiers opened fire for no reason, the system is operable to reconstruct the gunshot scenario with an immutable record of all data captured by the at least one sensor, the at least one device, the at least one computer, the at least one server, and/or the at least one node. Again, because the system uses both a digital signature and witness nodes prior to hashing, data integrity is preserved.

Figure 18:
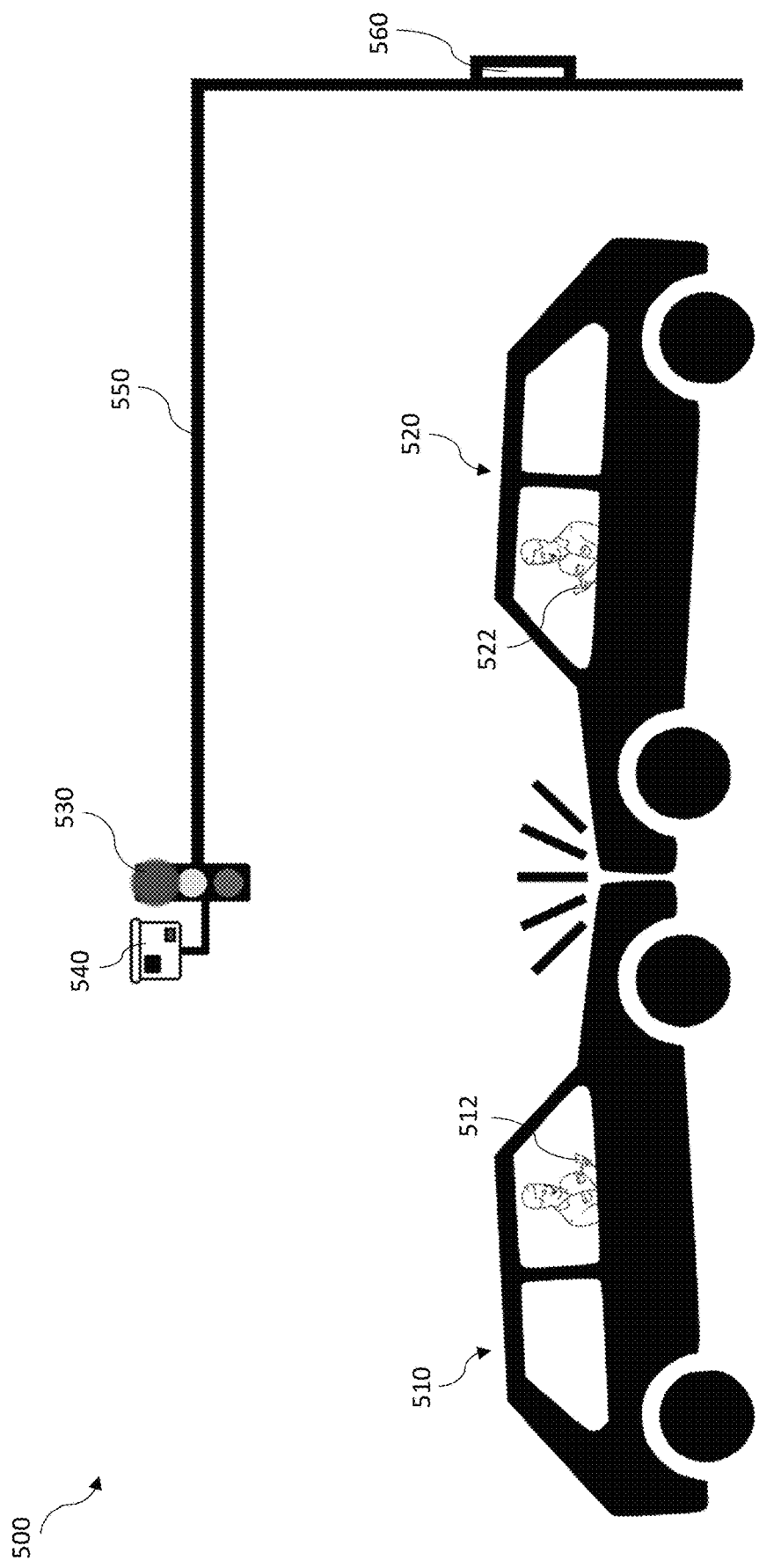
FIG. 18 illustrates an example of a car accident scene with at least one node.

FIG. 18 illustrates an example of a car accident scene 500 with at least one node 560. A first car 510 driven by a first driver 512 includes a plurality of sensors (e.g., tire sensors, temperature sensors, capacitive sensors, etc.). The first driver 512 has a first cell phone 514. In one embodiment, the first driver 512 is wearing at least one first wearable device (e.g., FITBIT, APPLE WATCH, SAMSUNG GALAXY WATCH, OURA RING) measuring at least one first biological signal (e.g., heart rate, respiratory rate, galvanic stress, sleep state). In one embodiment, at least one passenger in the first car 510 has at least one first passenger cell phone and/or at least one first passenger wearable device. A second car 520 driven by a second driver 522 includes a plurality of sensors (e.g., tire sensors, temperature sensors, capacitive sensors, etc.). The second driver 522 has a second cell phone 524. In one embodiment, the second driver 522 is wearing at least one second wearable device (e.g., FITBIT, APPLE WATCH, SAMSUNG GALAXY WATCH, OURA RING) measuring at least one second biological signal. In one embodiment, at least one passenger in the second car 520 has at least one second passenger cell phone and/or at least one second passenger wearable device.

In one embodiment, the accident scene 500 includes at least one traffic light 530 and/or at least one camera 540. In one embodiment, one or more of the at least one traffic light 530 and/or the at least one camera 540 is mounted on a traffic pole 550. In one embodiment, one or more of the at least one camera 540 is mounted in (e.g., on a dashboard) the first car 510 and/or the second car 520. Additionally or alternatively, one or more of the at least one camera 540 is mounted on a building. In the embodiment shown in FIG. 18, one of the at least one node 560 is mounted on the traffic pole. Alternatively, the at least one node 560 is mounted on a building (e.g., on a roof), in or on a light pole, or in a freestanding box.

The node 560 is operable to receive data from the plurality of sensors in the first car 510, the first cell phone 514, the at least one first wearable device, the at least one first passenger cell phone, the at least one first passenger wearable device, the plurality of sensors in the second car 520, the second cell phone 524, the at least one second wearable device, the at least one second passenger cell phone, the at least one second passenger wearable device, the at least one traffic light 530, and/or the at least one camera 540 in real time and/or in near-real time. Advantageously, the data allows the accident scene 500 to be reconstructed to determine how the accident happened. This ability to reconstruct the accident scene 500 is important as cars include more sensors and/or drive autonomously.

Figure 19:
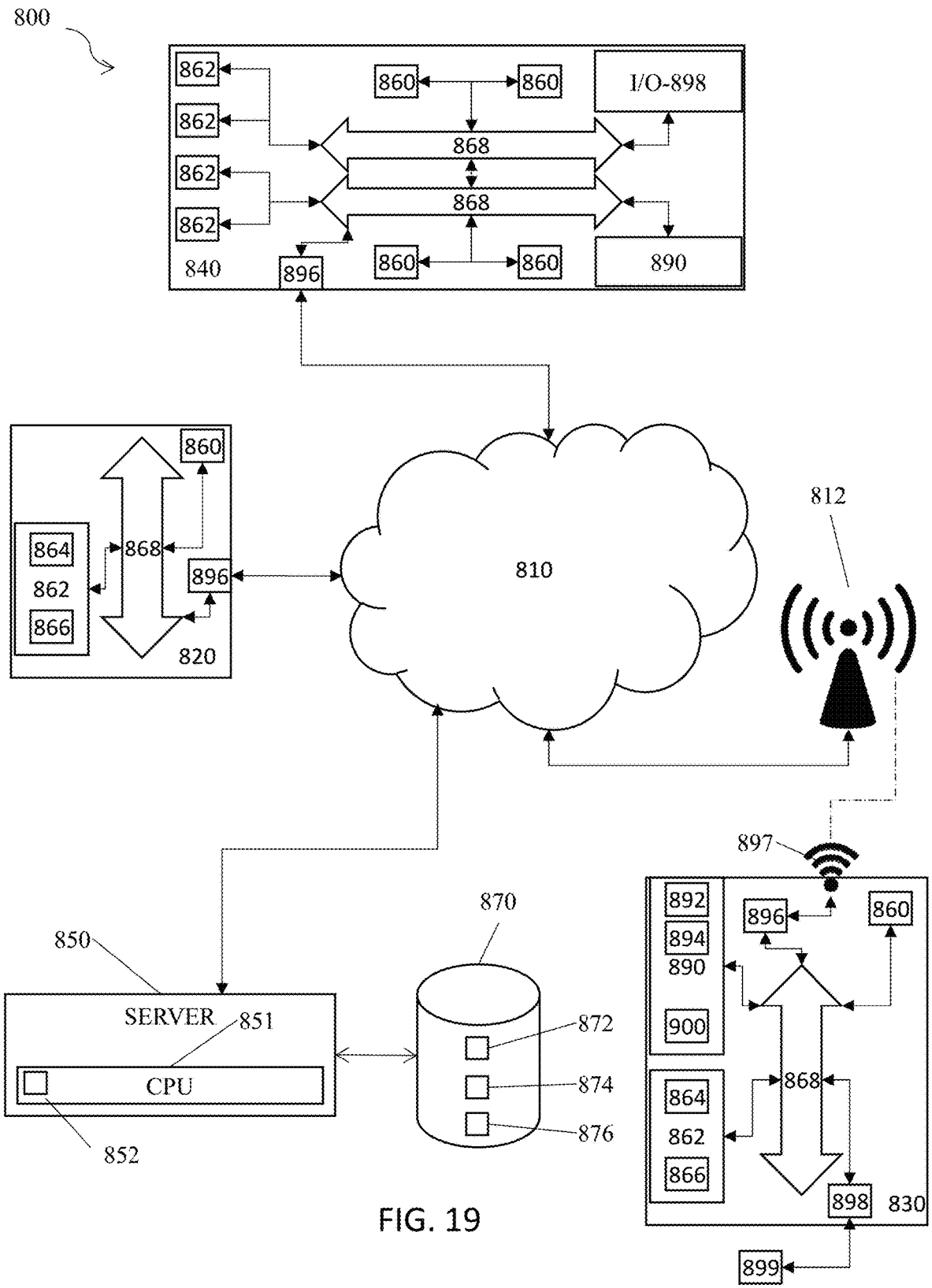
FIG. 19 is a schematic diagram of a system of the present invention.

FIG. 19 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 19, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 19, is operable to include other components that are not explicitly shown in FIG. 19, or is operable to utilize an architecture completely different than that shown in FIG. 19. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A method of providing notarization on a content-addressable peer-to-peer storage network comprising:
   providing a plurality of nodes, wherein each of the plurality of nodes is connected to at least one other node and is a zero-configuration edge node, wherein each of the plurality of nodes maintains a registry of the plurality of nodes in the form of data blocks, a registry of data blocks the node possesses or has learned from other nodes, and a number of data blocks which are persisted to the node;
   a first node of the plurality of nodes generating at least one new data block populated with data, signing the data with a signature, and appending the signature to the at least one new data block;
   hashing the data using an algorithm, thereby creating a hash of the data;
   signing the hash of the data using an encoded digital signature and appending the encoded digital signature to the at least one new data block;

triggering an event to an event handler and sending a signature request to a randomly selected set of peer nodes including the hash of the data;

each of the randomly selected set of peer nodes extracting the hash of the data and signing the hash of the data using a peer encoded digital signature, thereby creating a peer signed hash of the data;

each of the randomly selected set of peer nodes sending the peer signed hash of the data to the event handler;

validating the peer encoded digital signature;

the first node appending the peer encoded digital signature to the at least one new data block for each of the randomly selected set of peer nodes;

generating a block identification by hashing the at least one new data block with the peer encoded digital signature from each of the randomly selected set of peer nodes; and gossiping existence of the at least one new data block to adjacent nodes.

2. The method of claim 1, further including determining a quorum of the randomly selected set of peer nodes is present.

3. The method of claim 1, further including one or more of the adjacent nodes requesting the at least one new data block from the first node.

4. The method of claim 1, further including one or more of the adjacent nodes gossiping existence of the at least one new data block to at least one additional node.

5. The method of claim 1, wherein the at least one new data block includes metadata, and wherein the metadata includes node information, at least one link to another data block, and/or a number of cryptographic signatures and node identities.

6. The method of claim 1, further including configuring a number of peer nodes to form the randomly selected set of peer nodes.

7. The method of claim 1, further including validating the peer encoded digital signature using a public key from each of the randomly selected set of peer nodes.

8. The method of claim 1, wherein the at least one new data block includes a parent block and at least one child block.

9. The method of claim 1, further including encrypting communication between nodes using public key cryptography.

10. The method of claim 1, wherein one or more of the adjacent nodes is operable to purge at least one data block to store the at least one new data block.

11. A method of providing notarization on a content-addressable peer-to-peer storage network comprising:

providing a plurality of nodes, wherein each of the plurality of nodes is connected to at least one other node and is a zero-configuration edge node, wherein each of the plurality of nodes maintains a registry of the plurality of nodes in the form of data blocks, a registry of data blocks the node possesses or has learned from other nodes, and a number of data blocks which are persisted to the node;

a first node of the plurality of nodes generating at least one new data block populated with data, signing the data with a signature, and appending the signature to the at least one new data block;

hashing the data using an algorithm, thereby creating a hash of the data;

signing the hash of the data using an encoded digital signature and appending the encoded digital signature to the at least one new data block;

triggering an event to an event handler and sending a signature request to a randomly selected set of peer nodes including the hash of the data;

each of the randomly selected set of peer nodes extracting the hash of the data and signing the hash of the data using a peer encoded digital signature, thereby creating a peer signed hash of the data;

each of the randomly selected set of peer nodes sending the peer signed hash of the data to the event handler;

the event handler validating the peer encoded digital signature;

the first node validating the peer encoded digital signature and appending the peer encoded digital signature to the at least one new data block for each of the randomly selected set of peer nodes;

generating a block identification by hashing the at least one new data block with the peer encoded digital signature from each of the randomly selected set of peer nodes; and the event handler gossiping existence of the at least one new data block to adjacent nodes.

12. A system for providing notarization on a content-addressable peer-to-peer storage network comprising:

a plurality of nodes, wherein each of the plurality of nodes is connected to at least one other node and is a zero-configuration edge node, wherein the plurality of nodes are servers, comprised of at least a processor and a memory, wherein each of the plurality of nodes maintains a registry of the plurality of nodes in the form of data blocks, a registry of data blocks the node possesses or has learned from other nodes, and a number of data blocks which are persisted to the node;

wherein a first node of the plurality of nodes is operable to generate at least one new data block populated with data and sign the data with a signature, wherein the signature is appended to the at least one new data block;

wherein the first node is operable to hash the data using an algorithm, thereby creating a hash of the data;

wherein the first node is operable to sign the hash of the data using an encoded digital signature and append the encoded digital signature to the at least one new data block;

wherein the first node is operable to trigger an event to an event handler;

wherein the event handler is operable to send a signature request to a randomly selected set of peer nodes including the hash of the data;

wherein each of the randomly selected set of peer nodes is operable to extract the hash of the data and sign the hash of the data using a peer encoded digital signature, thereby creating a peer signed hash of the data;

wherein each of the randomly selected set of peer nodes is operable to send the peer signed hash of the data to the event handler;

wherein the first node is operable to validate the peer encoded digital signature and append the peer encoded digital signature to the at least one new data block for each of the randomly selected set of peer nodes;

wherein the first node is operable to generate a block identification by hashing the at least one new data block with the peer encoded digital signature from each of the randomly selected set of peer nodes; and wherein the event handler is operable to gossip existence of the at least one new data block to adjacent nodes.

13. The system of claim 12, wherein the at least one new data block includes metadata, and wherein the metadata includes node information, at least one link to another data block, and/or a number of cryptographic signatures and node identities.

14. The system of claim 12, wherein a number of peer nodes to form the randomly selected set of peer nodes is configurable.

15. The system of claim 12, wherein the encoded digital signature is an elliptic curve digital signature.

16. The system of claim 12, wherein the peer encoded digital signature is validated using a public key from each of the randomly selected of peer nodes.

17. The system of claim 12, wherein the at least one new data block includes a parent block and at least one child block.

18. The system of claim 12, wherein communication between nodes is encrypted using public key cryptography.

19. The method of claim 1, wherein at least one of the plurality of nodes is operable to purge at least one data block to store the at least one new data block after a purging threshold storage level is reached.

20. The system of claim 12, wherein at least one of the plurality of nodes is operable to purge at least one data block to store the at least one new data block after a purging threshold storage level is reached.

* * * * *